US008892898B2

(12) United States Patent  
Fujimori

(10) Patent No.: US 8,892,898 B2
(45) Date of Patent: Nov. 18, 2014

(54) PROJECTOR SYSTEM

(75) Inventor: Toshiki Fujimori, Chino (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 13/618,130

(22) Filed: Sep. 14, 2012

(65) Prior Publication Data

US 2013/0013929 A1 Jan. 10, 2013

Related U.S. Application Data

(63) Continuation of application No. 11/694,363, filed on Mar. 30, 2007, now Pat. No. 8,296,572.

(30) Foreign Application Priority Data

Apr. 4, 2006 (JP) ................................ 2006-102961
Feb. 13, 2007 (JP) ................................ 2007-031613

(51) Int. Cl.
*H04L 29/06* (2006.01)
*G06F 21/84* (2013.01)
*H04N 5/74* (2006.01)

(52) U.S. Cl.
CPC . *G06F 21/84* (2013.01); *H04N 5/74* (2013.01)
USPC .......... 713/183; 726/1; 726/2; 726/5; 353/40; 353/79; 353/122

(58) Field of Classification Search
CPC ............ G06F 21/84; G06F 21/82; H04N 5/74
USPC ....................................................... 713/183
See application file for complete search history.

(56) References Cited

U.S. PATENT DOCUMENTS 4,430,526 A 2/1984 Brown et al.
4,599,489 A 7/1986 Cargile
(Continued)

FOREIGN PATENT DOCUMENTS

EP 0 656 581 A1 6/1995
EP 0 737 911 A1 10/1996
(Continued)

OTHER PUBLICATIONS

Chen et al., Seamless provisioning of service in the ubiquitous computing environment, Nov. 2003, Proceedings of the Second International Conference on Machine Learning and Cybernetics, vol. 3, pp. 1904-1909.*

(Continued)

*Primary Examiner* — Thanhnga B Truong
*Assistant Examiner* — Kenneth Chang
(74) *Attorney, Agent, or Firm* — Oliff PLC

(57) ABSTRACT

A projector system includes an information processing apparatus and a projector. The projector includes a device connection unit which enables communication between the information processing apparatus and the projector, a password generating unit which generates a password, and an encryption unit which encrypts the password and outputs the encrypted password to the information processing apparatus through the device connection unit. The information processing apparatus includes a device connection unit which enables communication between the projector and the information processing apparatus, a decryption unit which decrypts the encrypted password input through the device connection unit of the information processing apparatus using a decryption key, and a password determining unit which has functions of determining whether the decrypted decryption password is correct and outputting a signal directing to start the process for projection to be performed by the information processing apparatus in a case where the decrypted password is correct.

9 Claims, 9 Drawing Sheets

(56) References Cited

U.S. PATENT DOCUMENTS

| | | |
|---|---|---|
| 4,800,590 A | 1/1989 | Vaughan |
| 5,572,193 A | 11/1996 | Flanders et al. |
| 5,758,079 A | 5/1998 | Ludwig et al. |
| 5,768,510 A | 6/1998 | Gish |
| 5,771,352 A | 6/1998 | Nakamura et al. |
| 5,877,747 A | 3/1999 | Kitao et al. |
| 6,141,000 A | 10/2000 | Martin |
| 6,148,406 A | 11/2000 | Weisz et al. |
| 6,169,976 B1 | 1/2001 | Colosso |
| 6,198,542 B1 | 3/2001 | Tabata |
| 6,345,294 B1 | 2/2002 | O'Toole et al. |
| 6,417,933 B1 | 7/2002 | Szurkowski |
| 6,493,467 B1 | 12/2002 | Okuda et al. |
| 6,642,918 B2 | 11/2003 | Uchida et al. |
| 6,670,603 B2 | 12/2003 | Shimada et al. |
| 6,735,616 B1 | 5/2004 | Thompson et al. |
| 6,760,749 B1 | 7/2004 | Dunlap et al. |
| 6,783,252 B1 | 8/2004 | Cambron |
| 6,828,986 B2 | 12/2004 | Sakashita et al. |
| 6,830,340 B2 | 12/2004 | Olson et al. |
| 6,904,451 B1 | 6/2005 | Orfitelli et al. |
| 6,904,526 B1 | 6/2005 | Hongwei |
| 6,928,166 B2 | 8/2005 | Yoshizawa |
| 6,957,232 B2 | 10/2005 | Hoeye et al. |
| 7,016,058 B1 | 3/2006 | Tabata |
| 7,016,935 B2 | 3/2006 | Lee et al. |
| 7,018,043 B2 | 3/2006 | Castaldi et al. |
| 7,047,088 B2 | 5/2006 | Nakamura et al. |
| 7,139,248 B2 | 11/2006 | Murai et al. |
| 7,191,214 B2 | 3/2007 | Watanabe |
| 7,254,418 B2 | 8/2007 | Iwasaki |
| 7,293,071 B2 | 11/2007 | Sato et al. |
| 7,397,476 B2 | 7/2008 | Akaiwa et al. |
| 7,403,510 B1 | 7/2008 | Miyake |
| 7,447,906 B2 | 11/2008 | Kubota |
| 7,486,254 B2 | 2/2009 | Suzuki et al. |
| 7,647,555 B1 | 1/2010 | Wilcox et al. |
| 7,770,210 B2 | 8/2010 | Kubota |
| 7,782,330 B2 | 8/2010 | Akaiwa et al. |
| 7,797,430 B2 | 9/2010 | Ichieda |
| 7,965,284 B2 | 6/2011 | Akaiwa et al. |
| 2001/0003479 A1 | 6/2001 | Fujiwara |
| 2001/0017630 A1 | 8/2001 | Sakashita et al. |
| 2001/0017712 A1 | 8/2001 | Kasatani |
| 2001/0021980 A1 | 9/2001 | Linden et al. |
| 2001/0037366 A1 | 11/2001 | Webb et al. |
| 2002/0015175 A1 | 2/2002 | Katsuda |
| 2002/0026512 A1 | 2/2002 | Nishimura et al. |
| 2002/0036652 A1 | 3/2002 | Masumoto et al. |
| 2002/0083319 A1 | 6/2002 | Ishiguro et al. |
| 2002/0090912 A1 | 7/2002 | Cannon et al. |
| 2002/0106086 A1* | 8/2002 | Kamiya et al. ............. 380/277 |
| 2002/0108108 A1 | 8/2002 | Akaiwa et al. |
| 2002/0122075 A1 | 9/2002 | Karasawa et al. |
| 2002/0131078 A1 | 9/2002 | Tsukinokizawa |
| 2002/0133713 A1 | 9/2002 | Fieschi et al. |
| 2002/0154210 A1 | 10/2002 | Ludwig et al. |
| 2002/0175915 A1 | 11/2002 | Lichtfuss |
| 2002/0196378 A1 | 12/2002 | Slobodin et al. |
| 2003/0017846 A1 | 1/2003 | Estevez et al. |
| 2003/0018895 A1* | 1/2003 | Morrison ..................... 713/176 |
| 2003/0028637 A1 | 2/2003 | Gross |
| 2003/0034999 A1 | 2/2003 | Coughlin, III et al. |
| 2003/0048281 A1 | 3/2003 | Murai et al. |
| 2003/0051139 A1 | 3/2003 | Kubota |
| 2003/0072429 A1 | 4/2003 | Slobodin et al. |
| 2003/0081561 A1 | 5/2003 | Hsiao |
| 2003/0088793 A1 | 5/2003 | Parry |
| 2003/0110217 A1 | 6/2003 | Raju |
| 2003/0115263 A1 | 6/2003 | Tran et al. |
| 2003/0191738 A1 | 10/2003 | Hoeye et al. |
| 2003/0198347 A1 | 10/2003 | Ribes et al. |
| 2003/0202661 A1* | 10/2003 | Rodriguez et al. ........... 380/239 |
| 2003/0202679 A1* | 10/2003 | Rodriguez ................... 382/100 |
| 2003/0204716 A1 | 10/2003 | Rockwood et al. |
| 2003/0217293 A1 | 11/2003 | Lee |
| 2003/0221011 A1 | 11/2003 | Shitano |
| 2003/0225641 A1 | 12/2003 | Gritzmacher et al. |
| 2003/0236895 A1 | 12/2003 | Ohkubo et al. |
| 2004/0051734 A1 | 3/2004 | Taniguchi et al. |
| 2004/0073795 A1 | 4/2004 | Jablon |
| 2004/0109137 A1 | 6/2004 | Bubie et al. |
| 2004/0117445 A9 | 6/2004 | Lee et al. |
| 2004/0119945 A1 | 6/2004 | Nakamura et al. |
| 2004/0123118 A1 | 6/2004 | Dahan et al. |
| 2004/0130502 A1 | 7/2004 | Sato et al. |
| 2004/0130568 A1 | 7/2004 | Nagano et al. |
| 2004/0141617 A1* | 7/2004 | Volpano ..................... 380/270 |
| 2004/0161277 A1* | 8/2004 | Gassho et al. ................. 400/76 |
| 2004/0227900 A1 | 11/2004 | Sato et al. |
| 2004/0236943 A1 | 11/2004 | Edwards et al. |
| 2004/0249945 A1 | 12/2004 | Tabuchi et al. |
| 2005/0012911 A1 | 1/2005 | Cambron |
| 2005/0033805 A1 | 2/2005 | Fujiyama et al. |
| 2005/0036509 A1 | 2/2005 | Acharya et al. |
| 2005/0043973 A1 | 2/2005 | Childers |
| 2005/0066047 A1 | 3/2005 | Miyake et al. |
| 2005/0068506 A1 | 3/2005 | Moriwaki et al. |
| 2005/0071430 A1 | 3/2005 | Kobayashi et al. |
| 2005/0091359 A1 | 4/2005 | Soin et al. |
| 2005/0097179 A1 | 5/2005 | Orme |
| 2005/0097335 A1* | 5/2005 | Shenoy et al. ............... 713/182 |
| 2005/0102356 A1 | 5/2005 | Manion et al. |
| 2005/0134523 A1* | 6/2005 | Challener et al. ............ 345/1.1 |
| 2005/0163549 A1* | 7/2005 | Shima et al. ................... 400/62 |
| 2005/0210390 A1 | 9/2005 | Ono |
| 2005/0262223 A1 | 11/2005 | Kimura |
| 2006/0170875 A1 | 8/2006 | Falck et al. |
| 2006/0184497 A1 | 8/2006 | Suzuki et al. |
| 2006/0250585 A1 | 11/2006 | Anderson et al. |
| 2007/0005809 A1 | 1/2007 | Kobayashi et al. |
| 2007/0286144 A1 | 12/2007 | Miyake |
| 2008/0234843 A1 | 9/2008 | Akaiwa et al. |
| 2010/0257586 A1 | 10/2010 | Kubota |
| 2011/0210977 A1 | 9/2011 | Akaiwa et al. |

FOREIGN PATENT DOCUMENTS

| | | |
|---|---|---|
| EP | 0 874 300 A2 | 10/1998 |
| EP | 1 059 766 A2 | 12/2000 |
| JP | A-06-197340 | 7/1994 |
| JP | A-07-200215 | 8/1995 |
| JP | A-07-336370 | 12/1995 |
| JP | A-09-503877 | 4/1997 |
| JP | A-09-198206 | 7/1997 |
| JP | A-09-205643 | 8/1997 |
| JP | A-10-200638 | 7/1998 |
| JP | A-10-289106 | 10/1998 |
| JP | A-11-098170 | 4/1999 |
| JP | A-11-319815 | 11/1999 |
| JP | B2-3017925 | 12/1999 |
| JP | A-2000-076028 | 3/2000 |
| JP | A-2000-089726 | 3/2000 |
| JP | A-2000-122829 | 4/2000 |
| JP | A-2000-122944 | 4/2000 |
| JP | A-2000-165577 | 6/2000 |
| JP | A-2000-222163 | 8/2000 |
| JP | A-2001-016664 | 1/2001 |
| JP | A-2001-092408 | 4/2001 |
| JP | A-2001-103078 | 4/2001 |
| JP | A-2001-144767 | 5/2001 |
| JP | A-2001-175602 | 6/2001 |
| JP | A-2001-202316 | 7/2001 |
| JP | A-2001-273259 | 10/2001 |
| JP | A-2001-312472 | 11/2001 |
| JP | A-2001-343959 | 12/2001 |
| JP | A-2001-358919 | 12/2001 |
| JP | A-2002-007091 | 1/2002 |
| JP | A-2002-007350 | 1/2002 |
| JP | A-2002-044096 | 2/2002 |
| JP | A-2002-057964 | 2/2002 |
| JP | A-2002-099473 | 4/2002 |
| JP | A-2003-006128 | 1/2003 |
| JP | A-2003-069923 | 3/2003 |

(56) References Cited

FOREIGN PATENT DOCUMENTS

| | | |
|---|---|---|
| JP | A-2003-110555 | 4/2003 |
| JP | A-2003-173117 | 6/2003 |
| JP | A-2003-173177 | 6/2003 |
| JP | A-2003-256063 | 9/2003 |
| JP | A-2003-333559 | 11/2003 |
| JP | A-2004-062477 | 2/2004 |
| JP | A-2005-084846 | 3/2005 |
| JP | A-2005-099574 | 4/2005 |
| JP | B2-4022683 | 10/2007 |
| WO | WO 95/10823 A1 | 4/1995 |
| WO | WO 99/37055 A1 | 7/1999 |
| WO | WO 01/92953 A1 | 12/2001 |

OTHER PUBLICATIONS

Dec. 6, 2011 Office Action issued in Japanese Application No. 2009-216796 (with translation).
Apr. 16, 2012 Office Action issued in U.S. Appl. No. 12/942,838.
Apr. 8, 2008 Office Action issued in U.S. Appl. No. 10/228,334.
Aug. 31, 2011 Office Action issued in U.S. Appl. No. 12/493,809.
Aug. 9, 2010 Office Action issued in U.S. Appl. No. 11/032,134.
Jan. 19, 2012 Office Action issued in U.S. Appl. No. 11/694,363.
Jul. 27, 2009 Office Action issued in U.S. Appl. No. 11/032,134.
Mar. 16, 2009 Office Action issued in U.S. Appl. No. 11/032,134.
Mar. 3, 2010 Office Action issued in U.S. Appl. No. 11/032,134.
May 11, 2011 Office Action issued in U.S. Appl. No. 12/942,838.
May 26, 2010 Notice of Allowance issued in U.S. Appl. No. 11/905,084.
Oct. 16, 2009 Office Action issued in U.S. Appl. No. 11/905,084.
Oct. 19, 2011 Office Action issued in U.S. Appl. No. 12/942,838.
Sep. 2, 2008 Office Action issued in U.S. Appl. No. 11/032,134.
May 23, 2013 Office Action issued in U.S. Appl. No. 13/587,555.
May 9, 2013 Office Action issued in U.S. Appl. No. 12/628,654.
U.S. Appl. No. 12/942,838 in the name of Kubota filed Nov. 19, 2010.
U.S. Appl. No. 13/531,868 in the name of Kubota filed Jun. 25, 2012.
U.S. Appl. No. 12/628,654 in the name of Sato et al. filed Dec. 1, 2009.
U.S. Appl. No. 13/531,048 in the name of Sato et al. filed Jun. 22, 2012.
U.S. Appl. No. 13/587,555 in the name of Kubota filed Aug. 16, 2012.
Jul. 12, 2013 Office Action issued in U.S. Appl. No. 12/942,838.
Nov. 13, 2013 Office Action issued in U.S. Appl. No. 12/628,654.
Nov. 8, 2013 Office Action issued in U.S. Appl. No. 13/531,048.
Apr. 26, 2013 Office Action issued in U.S. Appl. No. 13/531,868.
Jan. 25, 2006 Office Action issued in U.S. Appl. No. 10/228,334.
Jul. 11, 2006 Office Action issued in U.S. Appl. No. 10/228,334.
Nov. 9, 2006 Office Action issued in U.S. Appl. No. 10/228,334.
May 2, 2007 Office Action issued in U.S. Appl. No. 10/228,334.
Jul. 18, 2007 Advisory Action issued in U.S. Appl. No. 10/228,334.
Dec. 27, 2007 Office Action issued in U.S. Appl. No. 10/228,334.
Apr. 8, 2008 Interview Summary issued in U.S. Appl. No. 10/228,334.
Aug. 5, 2008 Notice of Allowance issued in U.S. Appl. No. 10/228,334.
Jul. 6, 2007 Office Action issued in Japanese Patent Application No. 11-360141 (translation only).
Richardson et al., "Virtual Network Computing," IEEE Internet Computing, vol. 2, No. 1, Jan./Feb. 1998; pp. 33-38.
Dec. 3, 2010 European Search Report issued in European Patent Application No. 10177908.0.
Dec. 3, 2010 European Search Report issued in European Patent Application No. 10177910.6.
Dec. 6, 2010 European Search Report issued in European Patent Application No. 10177911.4.
Bloom, Jeffrey A., "Security and Rights Management in Digital Cinema," Jul. 2003, Proceedings of International Conference on Multimedia and Expo, vol. 1, pp. 621-624.
Berger et al., "Using Symbiotic Displays to View Sensitive Information in Public," Mar. 2005, Third IEEE International Conference on Pervasive Computing and Communications, pp. 139-148.
Nov. 14, 2013 Office Action issued in U.S. Appl. No. 13/587,555.
U.S. Appl. No. 14/084,014 in the names of Kubota filed Nov. 19, 2013.
Apr. 8, 2014 Notice of Allowance issued in U.S. Appl. No. 13/587,555.
Mar. 26, 2014 Notice of Allowance issued in U.S. Appl. No. 13/531,048.
Mar. 31, 2014 Notice of Allowance issued in U.S. Appl. No. 12/628,654.

\* cited by examiner

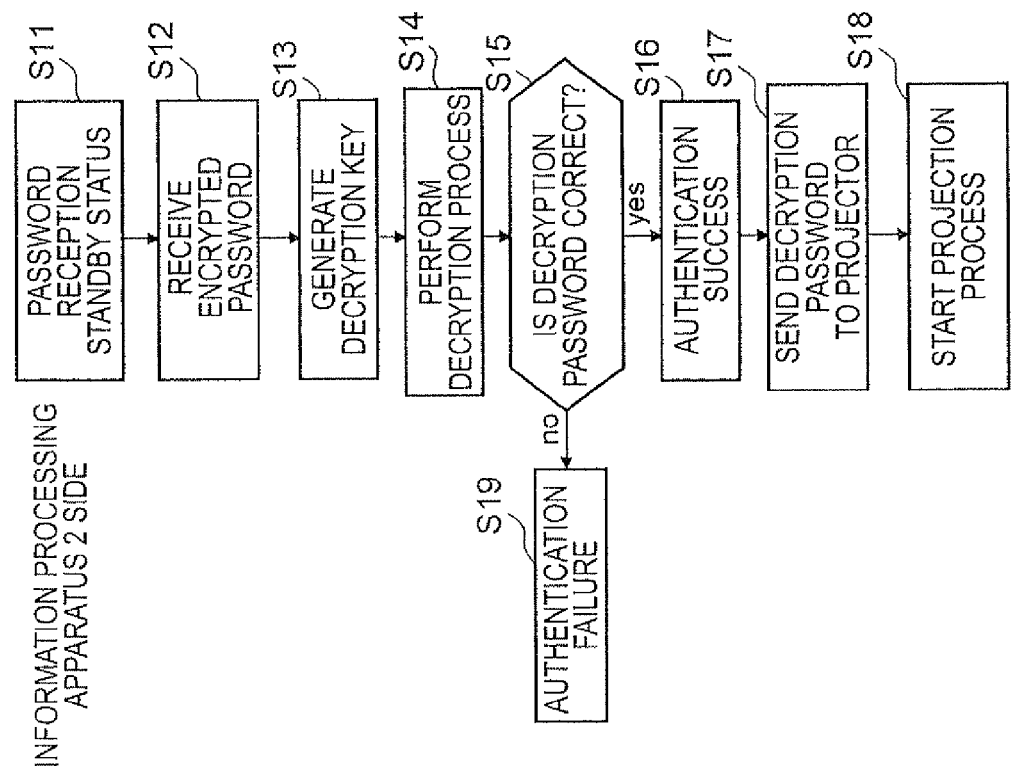
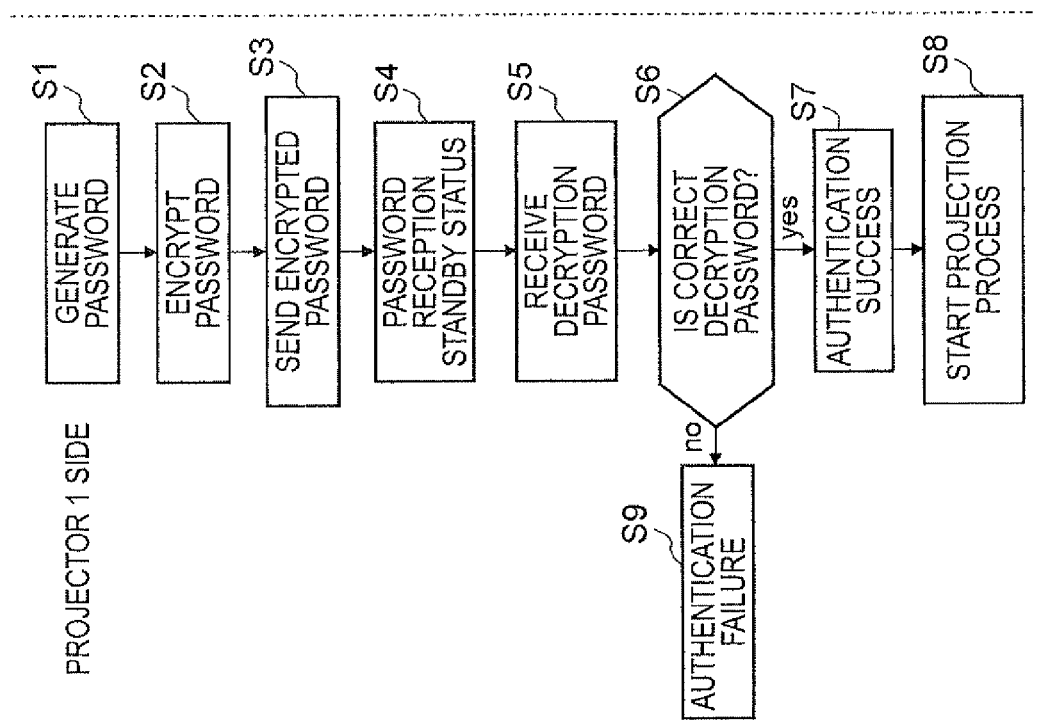
FIG. 3B
FIG. 3A

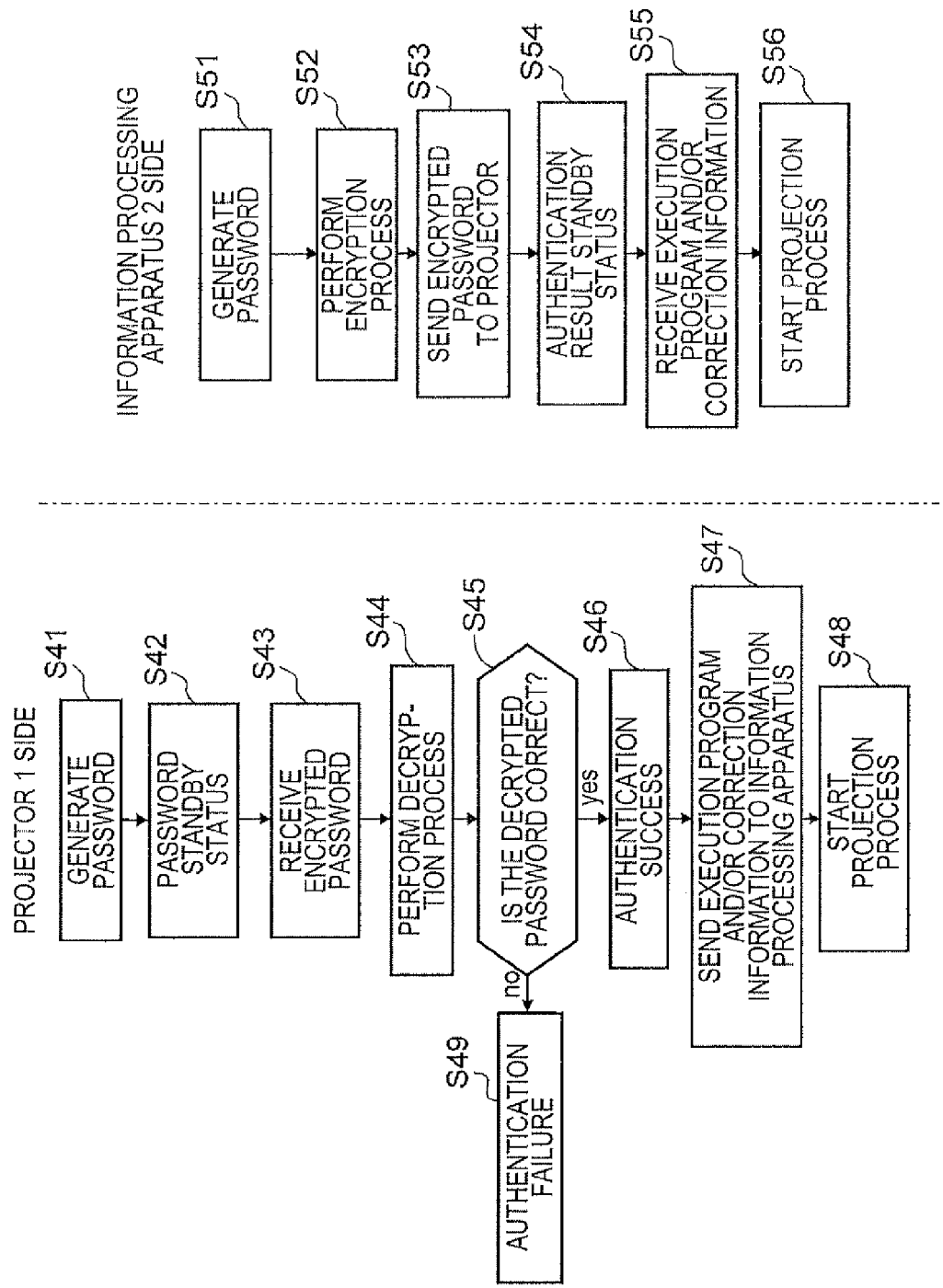

PROJECTOR SYSTEM

This is a Continuation of application Ser. No. 11/694,363 filed Mar. 30, 2007. The prior application, including the specification, drawings and abstract is incorporated herein by reference in its entirety.

BACKGROUND

1. Technical Field

The present invention relates to a projector system having an information processing apparatus supplying image data on which an image process is performed to a projector and the projector projecting an image based on the image data supplied from the information processing apparatus, a projector used for a projector system, and an information processing apparatus used for a projector system.

2. Related Art

In a projector system having an information processing apparatus (personal computer or the like) supplying image data on which an image process is performed to a projector and the projector projecting an image based on the image data supplied from the information processing apparatus, the image data to be displayed by the projector is generally transmitted as an analog signal from the information processing apparatus.

Accordingly, image data which is kept as digital data by the information processing apparatus is converted into an analog signal in advance by the information processing apparatus and then sent to the projector. In the projector, the analog signal transmitted from the information processing apparatus is converted into a digital signal, and image processes including a correction process are performed on the digital signal.

Recently, owing to the improvement of the performance of a CPU or a GPU for an information processing apparatus, a projector system in which image processes including a correction process (for example, form conversion, color correction) are performed in the information processing apparatus side, and image data (digital data) to be displayed by the projector is sent to the projector through a USB cable or the like has been proposed.

In this type of projector systems, since image data (digital data) on which the image process including a correction process is performed is sent to the projector, the image process including the correction process is not required in the projector side. These types of projector systems are called host-based projectors. The host-based projectors can be configured to have minimal components required for projection, and accordingly, the host-based projectors can be manufactured small and inexpensive.

However, in a projector system using the host-based projector, software for performing an image process (including a correction process) which is installed in the information processing apparatus along with the projector itself has a high value.

Accordingly, it is possible to produce and sell a projector so-called a pirated edition by a malignant user's combining the software and a projector (referred to as a non-formal projector) other than a formal one which forms a set with the software.

A technology to cope with this problem, for example, is disclosed in JP-A-2003-69923. In the technology, a password generated by the projector side is acquired by the information processing apparatus side, and the information processing apparatus side performs encryption, for example, using a WEP (Wired Equivalent Privacy) method, on image data to be sent to the projector using the acquired password each time the image data is sent, the encrypted image data is sent to the projector, and the projector side decrypts the encrypted image data sent from the information processing apparatus each time the encrypted image data is received and performs displaying.

As described above, in the technology disclosed in JP-A-2003-69923, the security of the software is acquired by encrypting image data and the like using a password for each new image and sending the encrypted image data and the like to the projector.

The technology disclosed in JP-A-2003-69923 is useful for acquiring the security of software.

However, in the technology, it is required that the information processing apparatus side encrypts the whole image data to be sent to the projector whenever the image is sent, the encrypted image data is sent to the projector, and the projector decrypts the encrypted image data whenever the encrypted image data is received. Moreover, since decrypting the encrypted image data at anytime when the encrypted image data is received requires corresponding preparation of hardware and software in the projector side, the configuration and process of the projector becomes complex.

The main purpose of the projector system using a host-based projector is to simplify the configuration and process of the projector by having the information processing apparatus side perform more processes, thereby lowering the development costs to lower the price of the product. Accordingly, the technology of decrypting encrypted image data each time when the encrypted image data is received, as the above-described technology which is disclosed in JP-A-2003-69923, is preferable in terms of acquiring the security of the projector, but there is a problem in that the advantage of a host-based projector cannot be taken fully.

SUMMARY

An advantage of some aspects of the invention is to provide a projector system capable of acquiring a high-level security together with maintaining the simplification of the configuration and process, a projector used for the projector system, and an information processing apparatus used for the projector system.

According to a first aspect of the invention, there is provided a projector system comprising an information processing apparatus supplying image data on which an image process is performed to a projector and the projector projecting an image based on the image data supplied from the information processing apparatus. The projector includes a device connection unit of the projector which enables communication between the information processing apparatus and the projector, a password generating unit of the projector which generates a password used for determining whether to start a process for projection, and an encryption unit of the projector which encrypts the password and outputs the encrypted password to the information processing apparatus through the device connection unit of the projector. The information processing apparatus includes a device connection unit of the information processing apparatus which enables communication between the projector and the information processing apparatus, a decryption unit of the information processing apparatus which decrypts the encrypted password input through the device connection unit of the information processing apparatus using a decryption key, and a password determining unit of the information processing apparatus which has functions of determining whether the decrypted decryption password is correct and outputting a signal directing to start the process for projection to be performed by the information processing apparatus in a case where the decrypted password is correct.

In the projector system according to the first aspect of the invention, when a password sent from the projector is determined to be correct, the information processing apparatus side determines the projector a formal projector and starts a process for projection (an image process including a correction process in the information processing apparatus).

Accordingly, for example, even when a non-formal projector other than a formal projector (non-formal projector) and software capable of performing a process for projection (an image process including a correction process) which is installed in the information processing apparatus are combined for performing projection, the projection cannot be performed using the projector. Accordingly, unfair use of the software by producing and selling a non-formal projector which is also referred to as a pirated edition through combining the software and the non-formal projector can be prevented.

Since the authentication process performed in the projector system is performed as an initial process prior to an actual projection process and only a password is encrypted and sent to the information processing apparatus in an initial process in the projector side, the process load of the projector can be reduced, compared with a case where a general method in which image data is encrypted each time before being sent and is sent to the projector side and the projector side decrypts the encrypted image data each time the image data is received is used.

As described above, the projector system according to the first aspect of the invention is capable of acquiring a high-level security with maintaining the simplification of the configuration and process of the projector. Moreover, since the projector system according to the first aspect of the invention is host-based, it is preferable that the projector side is simplified as possible as can be. According to the first aspect of the invention, the advantage of the host-based projector is not lost and a projector system capable of acquiring a high-level security can be built.

In the projector system according to the first aspect of the invention, it is preferable that the password determining unit of the information processing apparatus has a function of outputting the decrypted password to the projector through the device connection unit of the information processing apparatus, and that the projector further includes a password determining unit of the projector which determines whether the decrypted password input through the device connection unit of the projector is correct and outputs a signal directing to start a process for projection to be performed by the projector in a case where the decrypted password is correct.

As described above, it is determined whether a password decrypted by the information processing apparatus is correct in the projector side, too, and the process for projection is started in a case where the decrypted password is correct.

In other words, in the projector system, when the projector is determined to be a formal projector in the information processing apparatus and the software is determined to be a formal software in the projector side, the information processing apparatus side starts a process (an image process including a correction process) for projection for the projector and the projector side starts a process (for example, driving an optical system or an electro-optical modulation device) for projection to be performed by the projector itself.

As described above, it can be determined that software of the information processing apparatus is formal by not only determining whether the projector connected to the information processing apparatus is formal but also determining whether the software in the information processing apparatus is formal. Accordingly, for example, the replacement of the software of the information processing apparatus by non-formal software other than the formal software for being used can be prevented in this kind of a projector system.

In the projector system described above, it is preferable that the information processing apparatus further includes a password generating unit of the information processing apparatus side which generates a same password as the password generated by the projector and the password determining unit of the information processing apparatus side determines whether the decrypted password is correct by comparing the decrypted password with the password generated by the password generating unit of the information processing apparatus.

Accordingly, the information processing apparatus side can appropriately determine whether the password sent from the projector is correct.

In the projector system described above, it is preferable that the information processing apparatus acquires the decryption key through a network.

This means that the decryption key is acquired, for example, from a web site on the Web of a manufacturer of the projector or the like. More specifically, an authentication process of an inherent number assigned by the information processing apparatus is performed in a web site of a manufacturer or the like on the web by assigning the inherent number or the like to the projector by the information processing apparatus, and the information processing apparatus can acquire a decryption key from the site of the manufacturer or the like on the Web when the authentication process succeeds.

In this case, since the information processing apparatus constituting the projector system is connected to a manufacturer of the projector or the like through the Internet, information on the status of the projector system or the like can be transferred to its manufacturer from a user, and accordingly, there is an advantage in that the manufacturer can support the user using the projector system based on the information transferred from the user.

In the projector system described above, the projector has functions of keeping encrypted correction information generated by encrypting correction information which is used for performing inherent correction of the projector and sending the encrypted correction information and the encrypted password to the information processing apparatus.

As described above, since the projector has a function of keeping a status that inherent correction information of each projector is encrypted as encrypted correction information in the projector and sending the encrypted correction information together with the encrypted password to the information processing apparatus, the inherent correction information of each projector can be sent in a hidden status to the information processing apparatus when the inherent correction information of each projector is sent to the information processing apparatus.

In addition, by keeping the encrypted correction data in a storing unit of the projector in a status encrypted by an encryption unit which is capable of performing high-rate data compression, the data amount of the inherent correction information to be kept in the projector can be reduced. Accordingly, the storage capacity of the storing unit of the projector can be effectively used.

In the projector system described above, it is preferable that the password is generated to include information that changes by time such as date and time.

Accordingly, the reliability of the password can be increased. In this case, it is preferable that a predetermined valid period is set to the password. As described above, by setting a predetermined valid period, for example, when several people in one company use the same projector by turns or the like, the same password can be used for a normal operation within the valid period.

According to a second aspect of the invention, there is provided a projector system comprising an information processing apparatus supplying image data on which an image process is performed to a projector and the projector projecting an image based on the image data supplied from the information processing apparatus. The information processing apparatus includes, a device connection unit of the information processing apparatus which enables communication between the projector and the information processing apparatus, a password generating unit of the information processing apparatus which generates a password used for determining whether to start the process for projection, and an encryption unit of the information processing apparatus which encrypts the password and outputs the encrypted password to the projector through the device connection unit of the information processing apparatus. The projector includes a device connection unit of the projector which enables communication between the information processing apparatus and the projector, a decryption unit of the projector which decrypts the encrypted password input through the device connection unit of the projector using a decryption key, and a password determining unit of the projector which has functions of determining whether the decrypted decryption password is correct and outputting a signal directing to start the process for projection to be performed by the projector in a case where the decryption password is correct.

In the projector system according to the second aspect of the invention, the information processing apparatus side sends an encrypted password to the projector side, the projector side determines whether the password sent from the information processing apparatus is correct and starts a process for projection to be performed by the projector itself together with sending an authentication signal indicating the success of authentication to the information processing apparatus in a case where the password is correct.

By performing the authentication process described above, as in the projector system according to the first aspect of the invention, for example, even when a non-formal projector other than a formal projector (non-formal projector) and software capable of performing a process for projection (an image process including a correction process) which is installed in the information processing apparatus are combined for performing projection, the projection cannot be performed using the projector. Accordingly, unfair use of the software by producing and selling a projector, which is also referred to as a pirated edition, through combining the software and the non-formal projector can be prevented.

The authentication process performed in the projector system according to the second aspect of the invention, like in the projector system according to the first aspect of the invention, is performed as an initial process prior to an actual projection process. In other words, in the initial process of the projector system according to second aspect of the invention, the information processing apparatus side sends the encrypted password to the projector side, and the projector side decrypts the password sent from the information processing apparatus to perform a process for determining whether the decrypted password is correct.

Accordingly, in the projector system according to second aspect of the invention, like in the projector system according to the first aspect of the invention, the configuration and process of the projector side can be simplified, compared with a case where a general method in which image data is encrypted each time before being sent and is sent to the projector side and the projector side decrypts the encrypted image data each time the image data is received is used. As described above, in the projector system according to the second aspect of the invention, the advantage of the host-based projector is not lost and a projector system capable of acquiring a high-level security can be built.

In the projector system according to the second aspect of the invention, it is preferable that the projector further includes a password generating unit of the projector which generates a password used for determining whether to start the process for projection and the password generating unit of the information processing apparatus generates a same password as the password generated by the password generating unit of the projector.

As described above, the projector side can appropriately determine whether the password sent from the information processing apparatus is correct by generating a same password as the password generated by the password generating unit of the projector side in the information processing apparatus side.

In the projector system described above, it is preferable that the projector sends an authentication signal to the information processing apparatus when the decrypted password is correct and the information processing apparatus further includes a projection process start signal output unit that outputs a signal which directs to start the process for projection to be performed by the information processing apparatus based on the authentication signal sent from the projector.

As described above, when the password sent from the information processing apparatus can be authenticated by the projector side, the projector sends an authentication signal to the information processing apparatus and the information processing apparatus starts the process for projection to be performed by the information processing apparatus itself by the authentication signal from the projector. Accordingly, an appropriate authentication can be performed to make it possible to acquire high-level security of the projector system.

In the projector system described above, it is preferable that the projector has functions of keeping execution program which is used for performing the process for projection to be performed by the information processing apparatus in the information processing apparatus and sending the execution program to the information processing apparatus in a case where the decrypted password is correct and that the information processing apparatus performs the process for projection to be performed by the information processing apparatus using the execution program sent from the projector.

As described above, only when the password generated by the information processing apparatus can be authenticated by the projector side, the projector sends execution program to the information processing apparatus and the information processing apparatus performs a process for projection to be performed by the information processing apparatus itself using the execution program sent from the projector.

Accordingly, so long as the password generated by the information processing apparatus is not authenticated by the projector side, the information processing apparatus side cannot perform a process for projection, and thus, the security of the projector system can be improved still further.

In the projector system described above, it is preferable that the projector has functions of keeping correction information used for performing inherent correction of the projector and sending the correction information to the information processing apparatus in a case where the decrypted password is correct and that the information processing apparatus corrects the image data using the correction information sent from the projector.

As described above, only when the password generated by the information processing apparatus can be authenticated by the projector side, the projector sends correction information to the information processing apparatus and the information processing apparatus performs a correction process using the correction information sent from the projector. Accordingly, so long as the password generated by the information processing apparatus 2 is not authenticated by the projector side, the information processing apparatus side cannot perform a correction process to the projector, and thus, the security of the projector system can be improved still further.

Since the information processing apparatus cannot perform the image process itself when the execution program does not exist and the information processing apparatus cannot have appropriate image data when the correction information does not exist, the information processing apparatus cannot perform an appropriate image process even when one between the execution program and the correction information is missing. Accordingly, one between the correction information and the execution program may be sent to the information processing apparatus or both of the correction information and the execution program may not be sent thereto, only when the password generated by the information processing apparatus 2 can be authenticated by the projector side.

In the projector system described above, it is preferable that the password is generated to include information that changes by time such as date and time.

Accordingly, a same advantage as in the projector system described above can be acquired.

In the projector system described above, it is preferable that the password and the decryption key are generated based on an inherent number of the projector.

As described above, by generating the password and the decryption key based on an inherent number which is assigned to the projector, each projector can be assuredly specified and the password and the decryption key can be generated easily.

According to a third aspect of the invention, there is provided a projector used for a projector system having an information processing apparatus supplying image data on which an image process is performed to the projector and the projector projecting an image based on the image data supplied from the information processing apparatus. It is preferable that the projector includes a device connection unit of the projector which enables communication between the information processing apparatus and the projector, password generating unit of the projector which generates a password used for determining whether to start a process for projection, and an encryption unit of the projector which encrypts the password and outputs the encrypted password to the information processing apparatus through the device connection unit of the projector.

The projector according to the third aspect of the invention is a projector used for the projector system according to the first aspect of the invention. In the projector according to the third aspect of the invention, since the process of encrypting the password and sending the encrypted password to information processing apparatus is performed only as a process prior to an actual projection process, the process load of the projector is not increased and the configuration and process of the projector can be simplified. Consequently, in a projector according to the third aspect of the invention, the advantage of a host-based projector is not lost and the security of the projector can be acquired.

It is preferable that a feature of the projector system described above is included in the projector according to the third aspect of the invention.

According to a fourth aspect of the invention, there is provided an information processing apparatus used for a projector system having the information processing apparatus supplying image data on which an image process is performed to a projector and the projector projecting an image based on the image data supplied from the information processing apparatus. The information processing apparatus comprises a device connection unit of the information processing apparatus which enables communication between the projector and the information processing apparatus, a decryption unit of the information processing apparatus which receives the encrypted password sent from the projector as input through the device connection unit of the information processing apparatus and decrypts the input encrypted password using a decryption key, and a password determining unit of the information processing apparatus which has functions of determining whether the decrypted decryption password is correct and outputting a signal directing to start the process for projection to be performed by the information processing apparatus in a case where the decryption password is correct.

The information processing apparatus according to the fourth aspect of the invention is an information processing apparatus used in a projector system according to the first aspect of the invention. In the information processing apparatus according to the fourth aspect of the invention, the information processing apparatus determines whether the password sent from the projector is correct. When the password is correct, the information processing apparatus determines the projector to be a formal projector and starts the process (image process including a correction process) for projection.

Accordingly, for example, even when a non-formal projector other than a formal projector (non-formal projector) and software capable of performing a process for projection (image process including a correction process) which is installed in the information processing apparatus are combined for performing projection, the projection cannot be performed using the projector. Accordingly, unfair use of the software by producing and selling a projector which is also referred to as a pirated edition through combining the software and the non-formal projector can be prevented.

It is preferable that a same feature as the projector system described above is included in the information processing apparatus according to the third aspect of the invention.

According to a fifth aspect of the invention, there is provided a projector used for a projector system having an information processing apparatus supplying image data on which an image process is performed to the projector and the projector projecting an image based on the image data supplied from the information processing apparatus, the projector comprising a device connection unit of the projector which enables communication between the information processing apparatus and the projector, a decryption unit of the projector which receives the encrypted password sent from the information processing apparatus as input through the device connection unit of the projector and decrypts the input encrypted password using a decryption key; and a password determining unit of the projector which has functions of determining whether the decrypted decryption password is correct and outputting a signal directing to start the process for projection to be performed by the projector in a case where the decryption password is correct.

The projector according to the fifth aspect of the invention described is a projector used in a projector system according to the second embodiment. In the projector according to the fifth aspect of the invention, the projector decrypts the encrypted password sent from the information processing apparatus and determines whether the decrypted password is correct. When the decrypted password is correct, the projector starts a process for projection to be performed by the projector itself together with sending an authentication signal indicating the success of authentication to the information processing apparatus only as a process prior to an actual projection, and accordingly, the process load of the projector is not increased and the configuration and process of the projector can be simplified. Consequently, in a projector according to the fifth aspect of the invention, the advantage of a host-based projector is not lost and the security of the projector can be acquired.

It is preferable that a feature of the projector system described above is included in the projector according to the fifth aspect of the invention.

According to a sixth aspect of the invention, there is provided an information processing apparatus used for a projector system having the information processing apparatus supplying image data on which an image process is performed to the projector and the projector projecting an image based on the image data supplied from the information processing apparatus. The information processing apparatus comprises a device connection unit of the information processing apparatus which enables communication between the projector and the information processing apparatus, a password generating unit of the information processing apparatus which generates a password used for determining whether to start a process for projection, and an encryption unit of the information processing apparatus which encrypts the password and outputs the encrypted password to the projector through the device connection unit.

The information processing apparatus according to the sixth aspect of the invention is the information processing apparatus projector used in a projector system according to the second aspect of the invention. In the information processing apparatus according to the sixth aspect of the invention, the process of generating a password used for determining whether to start a process for projection, encrypting the generated password, and outputting the encrypted password to the projector is performed only as a process prior to a process for projection, and accordingly, the process of the information processing apparatus can be simplified.

It is preferable that a feature of the projector system described above is included in the information processing system according to the sixth aspect of the invention.

The present invention may be embodied as an authentication processing method in a projector system, an authentication processing method in a projector, an authentication processing program in a projector, an authentication processing method in an information processing apparatus, and an authentication processing program in an information processing apparatus which are to be described below.

According to a seventh aspect of the invention, there is provided an authentication processing method in a projector system having an information processing apparatus supplying image data on which an image process is performed to a projector and the projector projecting an image based on the image data supplied from the information processing apparatus. In the projector, the authentication processing method includes generating a password used for determining whether to start a process for projection and encrypting the password and outputting the encrypted password to the information processing apparatus through a device connection unit of the projector. In the information processing apparatus, the authentication processing method includes decrypting the encrypted password input through a device connection unit of the information processing apparatus using a decryption key and determining whether the decrypted decryption password is correct and outputting a signal directing to start a process for projection to be performed by the information processing apparatus in a case where the decrypted password is correct.

The authentication processing method in the projector system described above is performed by the projector system according to the first aspect of the invention. By using the authentication processing method in the projector system, a same advantage as the projector system according to the first aspect of the invention can be acquired. It is preferable that a same feature as the projector system described above is included in the projector system.

According to an eighth aspect of the invention, there is provided an authentication processing method in a projector used for a projector system having an information processing apparatus supplying image data on which an image process is performed to a projector and the projector projecting an image based on the image data supplied from the information processing apparatus. The authentication processing method in the projector includes generating a password used for determining whether to start a process for projection and encrypting the password and outputting the encrypted password to the information processing apparatus through a device connection unit of the projector side.

The authentication processing method in a projector according to the eighth aspect of the invention is performed by the projector according to the third aspect of the invention. By using the authentication processing method in the projector according to the eighth aspect of the invention, a same advantage as the projector according to the third aspect of the invention can be acquired. It is preferable that a same feature as the projector system described above is included in the authentication processing method in the projector.

According to a ninth aspect of the invention, there is provided an authentication processing program in a projector used for a projector system having an information processing apparatus supplying image data on which an image process is performed to a projector and the projector projecting an image based on the image data supplied from the information processing apparatus. The authentication processing program includes generating a password used for determining whether to start a process for projection and encrypting the password and outputting the encrypted password to the information processing apparatus through a device connection unit of the projector.

The authentication processing program in the projector according to the ninth aspect of the invention is performed by the projector according to the third aspect of the invention. By using the authentication processing program in the projector according to the ninth aspect of the invention, a same advantage as the projector according to the third aspect of the invention can be acquired. It is preferable that a same feature as the projector system described above is included in the projector.

According to a tenth aspect of the invention, there is provided an authentication processing method in an information processing apparatus used for a projector system having an information processing apparatus supplying image data on which an image process is performed to a projector and the projector projecting an image based on the image data supplied from the information processing apparatus. The authentication processing method includes receiving an encrypted password sent from the projector as input through a device connection unit of the information processing apparatus and decrypting the input encrypted password using a decryption key and determining whether the decrypted decryption password is correct and outputting a signal directing to start the process for projection to be performed by the information processing apparatus in a case where the decryption password is correct.

The authentication processing method in the information processing apparatus according to the tenth aspect of the invention is performed by the information processing apparatus according to the fourth aspect of the invention. By using the authentication processing method in the information processing apparatus according to the tenth aspect of the invention, a same advantage as the information processing method according to the fourth aspect of the invention can be acquired. It is preferable that a same feature as the projector system described above is included in the authentication processing method in the information processing apparatus.

According to an eleventh aspect of the invention, there is provided an authentication processing method in an information processing apparatus used for a projector system having an information processing apparatus supplying image data on which an image process is performed to a projector and the projector projecting an image based on the image data supplied from the information processing apparatus. The authentication processing method includes receiving an encrypted password sent from the projector as input through a device connection unit of the information processing apparatus and decrypting the input encrypted password using a decryption key and determining whether the decrypted decryption password is correct and outputting a signal directing to start the process for projection to be performed by the information processing apparatus in a case where the decryption password is correct.

The authentication processing program in the information processing apparatus according to the eleventh aspect of the invention is performed by the information processing apparatus according to the fourth aspect of the invention. It is preferable that a same aspect as the projector system described above is included in the authentication processing program in the information processing apparatus.

According to a twelfth aspect of the invention, there is provided an authentication processing method in a projector system having an information processing apparatus supplying image data on which an image process is performed to a projector and the projector projecting an image based on the image data supplied from the information processing apparatus. In the information processing apparatus, the authentication processing method includes generating a password used for determining whether to start the process for projection and encrypting the password and outputting the encrypted password to the projector through a device connection unit of the information processing apparatus. In the projector, the authentication processing method includes decrypting the encrypted password input through a device connection unit of the projector using a decryption key and determining whether the decrypted decryption password is correct and outputting a signal directing to start a process for projection to be performed by the projector in a case where the decryption password is correct.

The authentication processing method in the projector system according to the twelfth aspect of the invention is performed by the projector system described according to the second aspect of the invention. By using the authentication processing method in the projector system, a same advantage as the projector system according to the second aspect of the invention can be acquired. It is preferable that a same feature as the projector system described above is included in the authentication processing method in the projector system.

According to a thirteenth aspect of the invention, there is provided an authentication processing method in a projector used for a projector system having an information processing apparatus supplying image data on which an image process is performed to a projector and the projector projecting an image based on the image data supplied from the information processing apparatus. The authentication processing method includes receiving an encrypted password sent from the information processing apparatus as input through a device connection unit of the projector side and decrypting the input encrypted password using a decryption key and determining whether the decrypted decryption password is correct and outputting a signal directing to start a process for projection to be performed by the projector in a case where the decryption password is correct.

The authentication processing method in a projector according to the thirteenth aspect of the invention is performed by the projector according to the fifth aspect of the invention. By using the authentication processing method in the projector, a same advantage as the projector according to the fifth aspect of the invention can be acquired. It is preferable that a same feature as the projector systems described above is included in the authentication processing method in the projector.

According to a fourteenth aspect of the invention, there is provided an authentication processing program in a projector used for a projector system having an information processing apparatus supplying image data on which an image process is performed to a projector and the projector projecting an image based on the image data supplied from the information processing apparatus. The authentication program includes receiving an encrypted password sent from the information processing apparatus as input through a device connection unit of the projector and decrypting the input encrypted password using a decryption key and determining whether the decrypted decryption password is correct and outputting a signal directing to start a process for projection to be performed by the projector in a case where the decryption password is correct.

The authentication processing program in a projector according to the fourteenth aspect of the invention is performed by the projector according to the fifth aspect of the invention. By using the authentication processing program in the projector, a same advantage as the projector according to the fifth aspect of the invention can be acquired. It is preferable that a same feature as the projector systems described above is included in the authentication processing program in the projector.

According to a fifteenth aspect of the invention, there is provided an authentication processing method in an information processing apparatus used for a projector system having an information processing apparatus supplying image data on which an image process is performed to a projector and the projector projecting an image based on the image data supplied from the information processing apparatus. The authentication processing method includes generating a password used for determining whether to start a process for projection and encrypting the password and outputting the encrypted password to the projector through a device connection unit of the information processing apparatus.

The authentication processing method in the information processing apparatus according to the fifteenth aspect of the invention is performed by the information processing apparatus according to the sixth aspect of the invention. By using the authentication processing method in the information processing apparatus, a same advantage as the information processing apparatus according to the sixth aspect of the invention can be acquired. It is preferable that a same feature as the projector systems described above is included in the authentication processing method in the information processing apparatus.

According to a sixteenth aspect of the invention, there is provided an authentication processing program in an information processing apparatus used for a projector system having an information processing apparatus supplying image data on which an image process is performed to a projector and the projector projecting an image based on the image data supplied from the information processing apparatus. The authentication processing program includes generating a password used for determining whether to start a process for projection and encrypting the password and outputting the encrypted password to the projector through a device connection unit of the information processing apparatus.

The authentication processing program in the information processing apparatus according to the sixteenth aspect of the invention is performed by the information processing apparatus according to the sixth aspect of the invention. By using the authentication processing program in the information processing apparatus, a same advantage as the information processing apparatus according to the sixth aspect of the invention can be acquired. It is preferable that a same feature as the projector systems described above is included in the authentication processing program in the information processing apparatus.

BRIEF DESCRIPTION OF THE DRAWINGS

The invention will be described with reference to the accompanying drawings, wherein like numbers reference like elements.

FIGS. 3A and 3B are flowcharts showing a sequence of an authentication process of a projector system according to Embodiment 1.

FIGS. 9A and 9B are flowcharts showing a sequence of an authentication process of a projector system according to Embodiment 5.

DESCRIPTION OF EXEMPLARY EMBODIMENTS

Hereinafter, embodiments of the present invention will be described.

Embodiment 1

Figure 1:
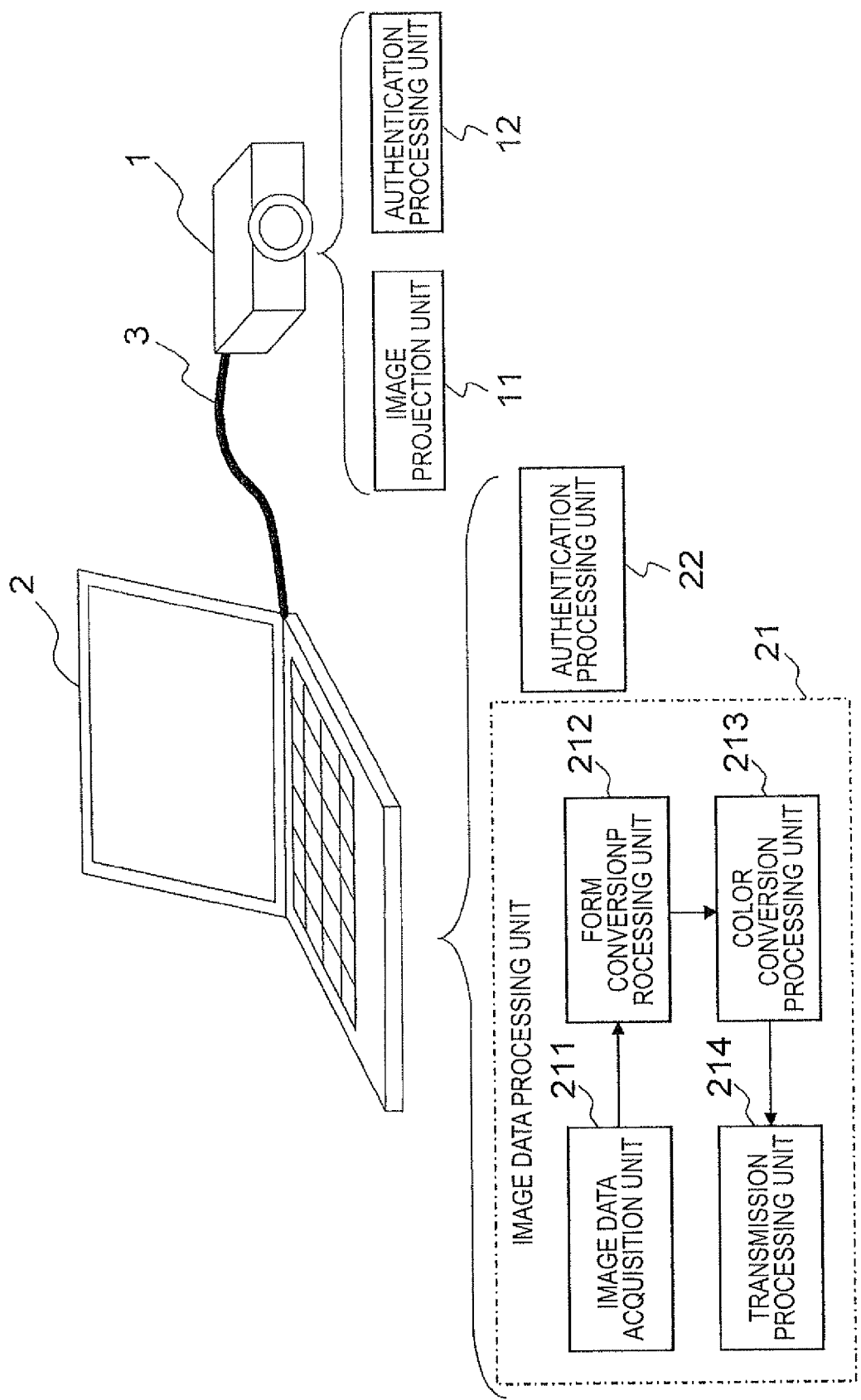
FIG. 1 is a diagram showing an external configuration of a projector system according to an embodiment of the invention.

FIG. 1 is a diagram showing an external configuration of a projector system according to Embodiment 1 of the invention. As shown in FIG. 1, the projector system according to Embodiment 1 includes a projector 1 and an information processing apparatus 2 such as a personal computer, wherein the projector 1 and the information processing apparatus 2 are connected to each other through a connection cable 3. The external configuration of the projector system shown in FIG. 1 is common to other projector systems according to the other embodiments to be described later.

The projector 1 which is used in projector systems according to the embodiments of the invention is so-called a host-based projector. In other words, an image process including a correction process is performed in an information processing apparatus 2 side, image data on which the image process including the correction process has been performed is converted into digital data and transferred to the projector 1, and the projector 1 receives the image data from the information processing apparatus 1 and performs a process for projection on the image data.

Accordingly, the information processing apparatus 2 includes an image data processing unit 21 which processes an image to be projected by the projector 1. The image data processing unit 21 includes an image data acquisition unit 211, a shape-conversion processing unit 212, a color-conversion processing unit 213, and a transmission processing unit 214. In addition, the information processing apparatus 2 includes an authentication processing unit 22 which performs an authentication process between the projector 1 and the information processing apparatus 2.

The projector 1 includes an image projection unit 11 which has an electro-optical modulation device, an optical system, and a control device controlling the electro-optical modulation device and the optical system and an authentication processing unit 12 which performs an authentication process between the information processing apparatus 2 and the projector 1.

Figure 2:
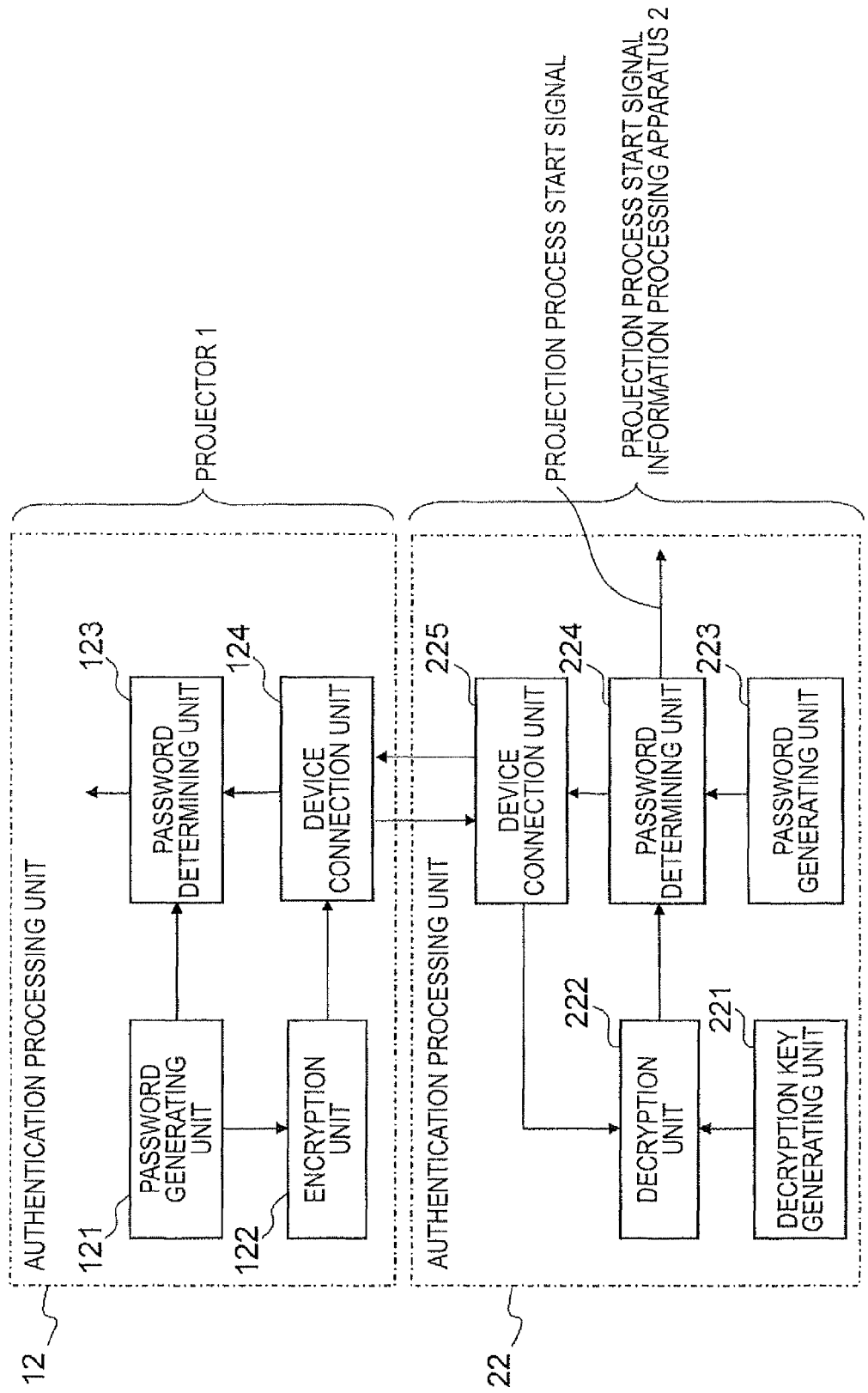
FIG. 2 is a diagram showing a configuration of a projector system according to Embodiment 1.

FIG. 2 is a diagram showing a configuration of the projector system according to the Embodiment 1. In FIG. 2, the projector 1 and an information processing apparatus 2 show configurations of the authentication processing unit 12 in the projector side 1 and the authentication processing unit 22 in the information processing apparatus 2 which are shown in FIG. 1. In FIG. 2, other components, that is, the image projection unit 11 of the projector 1, the image data processing unit 21 of the information processing apparatus 2, and the like are not shown.

As shown in FIG. 2, the authentication processing unit 12 in the projector side 1 includes a password generating unit 121 in the projector side which generates a password which is used for determining whether to start a projection process, an encryption unit 122 in the projector side which encrypts a password generated by the password generating unit 121 and outputs the encrypted password, a password determination unit 123 in the projector side which inputs the password transferred from the information processing apparatus 2, determines whether the input password is correct, and outputs a signal (referred to as a projection process start signal) which directs to start the projection process (for example, driving an optical system or an electro-optical modulation apparatus) to be performed by the projector 1 to the image projection unit 11 or the like in a case where the password is correct, and a device connection unit 124 which connects the projector 1 and the information processing apparatus 2 to each other for the communication therebetween.

The authentication processing unit 22 of the information processing apparatus 2 includes a decryption key generating unit 221 which generates a decryption key for decrypting the encrypted password (referred to as an encrypted password) transferred from the projector 1, a decryption unit 222 in the information processing apparatus side which decrypts the encrypted password using the decryption key which is generated by the decryption key generating unit 221, a password generating unit 223 in the information processing apparatus side which generates a password of the projector 1, a password determination unit 224 in the information process apparatus side which determines whether the decrypted password is correct by comparing a decrypted password (referred to as a decrypted password) decrypted by the decryption unit 222 and a password generated by the password generating unit 223 and outputs the decrypted password to the projector 1 together with outputting a signal (referred to as a projection process start signal) which directs to start the projection process (an image process including a correction process and the like) to be performed by the information processing apparatus 2 to the image data processing unit 21 or the like in a case where the decrypted password is determined to be correct as the password of the projector 1, and a device connection unit 225 which connects the information processing apparatus 2 and the projector 1 to each other for the communication therebetween.

Under this configuration, a sequence of an authentication process in the projector system according to Embodiment 1 will now be described. This authentication process is performed as a process performed prior to the projection process to be performed by the projector 1 and the projection process to be performed by the information processing apparatus 2 after the projector 1 is connected to the information processing apparatus 2.

At first, in the projector 1, a password is generated by the password generating unit 121, and the generated password is encrypted by the encryption unit 122. Next, the encryption unit 122 outputs the encrypted password to the information processing apparatus 2 through the device connection unit 124.

The password generated by the password generating unit 121 is a unique value to each projector and is generated based on an inherent number (referred to as an object number) such as a serial number assigned to each projector.

In the information processing apparatus 2 side, the decryption unit 222 receives the encrypted password through the device connection unit 225 as input and decrypts the encrypted password using the decryption key to acquire the password of the projector 1. The decryption key is generated based on the object number of the projector 1 by the decryption key generating unit 221.

In the information processing apparatus 2 side, a password of the projector 1 is generated from the object number of the projector 1 which is connected to the information processing apparatus 2 by the password generating unit 223. The generation of the password by the password generating unit 223 is performed by user's input of a serial number of the projector 1 at a time when the projector 1 is connected to the information processing apparatus 2, and the same password as that of the projector 1 is generated.

In the information processing apparatus 2 side, it is determined whether the decrypted password is correct by comparing the decrypted password and the password generated by the password generating unit 223 using the password determination unit 224. When both passwords are not identical as the result of the determination, it is determined that the decrypted password is incorrect, and accordingly, the projection process is not performed.

On the other hand, when the decrypted password and the password generated by the password generating unit 223 are identical and thus the decrypted password is determined to be correct by the password determination unit 224, the projector 1 is determined to be a formal projector. At this time, the password determination unit 224 of the information processing apparatus 2 outputs the decrypted password which has been decrypted by the information processing apparatus 2 to the projector 1 through the device connection unit 225 together with outputting a signal (projection process start signal) which directs to start the projection process of the information processing apparatus 2 side to the image data processing unit 21 shown in FIG. 1 and the like.

When the projector 1 side receives the decrypted password transferred from the information processing apparatus 2, it is determined whether the decrypted password and the password generated by the projector itself (password generated by the password generating unit 121) are identical by the password determination unit 123, and a signal (projection process start signal) which directs to start the projection process to be performed by the projector 1 is output to the image projection unit 11 shown in FIG. 1 and the like only in a case where the decrypted password transferred from the information processing apparatus 2 is identical to the password generated by the projector itself.

When the decrypted password transferred from the information processing apparatus 2 is not identical to the password generated by the projector itself, the projection process to be performed by the projector 1 is not performed.

As described above, not only the password transferred from the projector 1 is determined to be correct or not in the information processing apparatus 2 side, but also the decrypted password acquired by decrypting in the information processing apparatus 2 side is determined to be correct or not in the projector side 1.

Accordingly, the information processing apparatus 2 side can determine whether the projector 1 connected thereto as hardware is a formal projector. In addition, the projector 1 side can determine whether the software of the information processing apparatus 2 connected thereto is formal software.

When the information processing apparatus 2 determines the projector 1 to be a formal projector and the projector 1 determines the software of the information processing apparatus 2 to be formal software, the information processing apparatus 2 starts a projection process to be performed by the information processing apparatus 2 for the projector 1 and the projector 1 starts a projection process to be performed by the projector itself.

As described above, it can be confirmed that the software of the information processing apparatus 2 is formal software of the projector system by not only determining whether the projector 1 connected to the information processing apparatus 2 is a formal projector but also determining whether the software of the information processing apparatus 2 is formal software. Accordingly, for example, the replacement of the software of the information processing apparatus 2 by non-formal software other than the formal software for being used can be prevented in this kind of a projector system.

FIGS. 3A and 3B are flowcharts showing a sequence of an authentication process of a projector system according to Embodiment 1. FIG. 3A shows a process sequence performed by the projector 1, and FIG. 3B shows a process sequence performed by the information processing apparatus 2. Since the process in each step is described above, here, the sequence of the whole process will be described briefly.

At first, the projector 1 generates a password (step S1), encrypts the generated password (step S2), and transfers the encrypted password (step S3). Here, the projector 1 is in a status of waiting for a password (decrypted password) from the information processing apparatus 2, that is, a password reception standby status (step S4).

When the information processing apparatus 2 receives an encrypted password (step S12) in a status of waiting for a password (encrypted password) from the projector 1, that is, a password standby status (step S11), the information processing apparatus 2 generates a decryption key (step S13) and performs a decryption process (step S14).

Thereafter, the information processing apparatus 2 determines whether the decrypted password is correct (step S15). When the decrypted password is correct, the information processing apparatus 2 determines an authentication success (step S16) and transfers the decrypted password to the projector 1 together with starting the projection process to be performed by the information processing apparatus 2 (steps S17 and S18). On the other hand, when the decrypted password is determined to be incorrect in step 915, the information processing apparatus 2 determines an authentication failure (step S19). When the authentication failure occurs, the information processing apparatus 2 does not perform the projection process.

When the decrypted password is transferred from the information processing apparatus 2 in the password standby status waiting for a password from the information processing apparatus 2 (step S4), the projector 1 receives the decrypted password (step S5) and determines whether the decrypted password is correct (step S6). When the decrypted password is correct, the projector 1 determines an authentication success (step S7) and starts the projection process to be performed by the projector 1 (step S8). On the other hand, when the decrypted password is determined to be incorrect in step 96, the projector 1 determines an authentication failure (step S9) When the authentication failure occurs, the projector 1 does not perform the projection process.

The authentication process described above may be performed by a user's operation following a predetermined sequence after the projector 1 is connected to the information processing apparatus 2. However, it is preferable that the authentication process is automatically performed by the system when the projector 1 is connected to the information processing apparatus 2. In this case, the input of an object number such as a serial number is performed by the user. This applies the same to projector systems according to other embodiments to be described later.

The input operation of the object number by the user is performed only once when the projector 1 is connected to the information processing apparatus 2. The authentication process described above is performed by storing the input individual number in a storing unit and retrieving the individual number from the storing unit by the system as is needed thereafter. Accordingly, the operation of the user can be minimized, thereby improving the user convenience.

Embodiment 2

Embodiment 2 is an example in which a decryption key used for decrypting an encrypted password in the information processing apparatus 2 is acquired from a predetermined site on the Web by the information processing apparatus 2.

Figure 4:
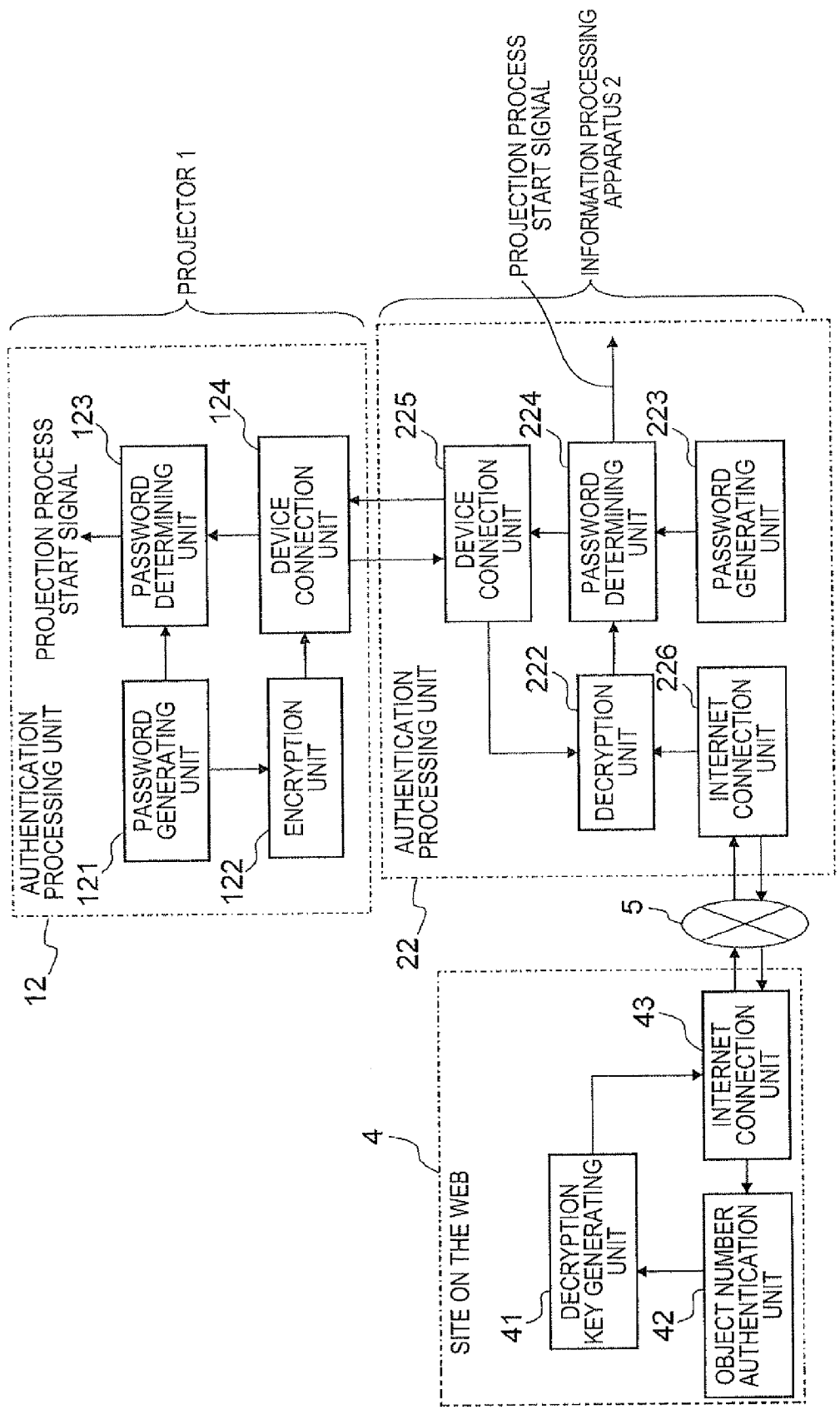
FIG. 4 is a diagram showing a configuration of a projector system according to Embodiment 2.

FIG. 4 is a diagram showing a configuration of the projector system according to the Embodiment 2. In FIG. 4, like in FIG. 2, only the configurations of the authentication processing unit 12 of the projector 1 and the authentication processing unit 22 of the information processing apparatus 2 which are shown in FIG. 1. are shown.

As shown in FIG. 4, there is a decryption key generating unit 41 in a predetermined site 4 (for example, a site of a manufacturer of projectors) or the like on the Web. Accordingly, the information processing apparatus 2 needs to be connected to a network 5 such as the Internet. The site 4 on the Web having the decryption key generating unit 41 includes an object authentication unit 42 which authenticates an object number. In addition, the information processing apparatus 2 has an Internet connection unit 226.

Under this configuration, when the information processing apparatus 2 assigns an object number of the projector 1 to be processed, the authentication process of the object number assigned by the information processing apparatus 2 is performed by the object authentication unit 42 which is provided in the site 4 on the Web having the decryption key generating unit 41. When the object number is correct, a decryption key corresponding to the object number is generated by the decryption key generating unit 41.

The information processing apparatus 2 acquires the decryption key from the site 4 on the Web and the decryption unit 222 decrypts the encrypted password using the acquired decryption key. Thereafter, the same process as that in the projector system according to Embodiment 1 is performed. To the same elements in FIG. 4 as those in FIG. 1, the same reference numerals are attached.

According to a projector system according to Embodiment 2, since the information processing apparatus 2 constituting the projector system is connected to a manufacturer of the projector 1 or the like through a network 5 such as the Internet, information on the status of the projector system or the like can be transferred to its manufacturer from a user, and accordingly, there is an advantage in that the manufacture can support the user using the projector system based on the information transferred from the user. For example, it becomes possible to transfer a correction parameter based on the projection environment of the projector in the projector system.

In addition, since a process such as a decryption key generating process is not required in the projector system side of the projector system according to Embodiment 2, the decryption key generating unit is needless in the information process apparatus 2, and accordingly, there is an advantage in that the configuration and process of the information processing apparatus 2 can be simplified.

Although examples in which the projector systems according to Embodiments 1 and 2 set the password using a fixed value such as an object number are described, it is possible to set the password using information such as date and time which changes its value in addition to the object number.

In this case, the projector 1 encrypts a password including an object number and information such as date and time and transfers the encrypted password to the information processing apparatus 2, and the information processing apparatus 2 generates a decryption key which is generated based on the date and time in addition to the object number and performs decrypting. As described in Embodiment 2, when the decryption key generating unit is in a site on the Web, a decryption key which is generated based on the date and time in addition to the object number is generated to perform a decryption process likewise.

As described above, by configuring the password including the date and time or the like in addition to the object number, the security can be increased. When the password is configured to include the data and time as described above, it is preferable to set a predetermined valid period. Accordingly, for example, when several people in one company use the same projector by turns or the like, since the same password can be used for the normal operation within the valid period, the user convenience can be improved.

Embodiment 3

Figure 5:
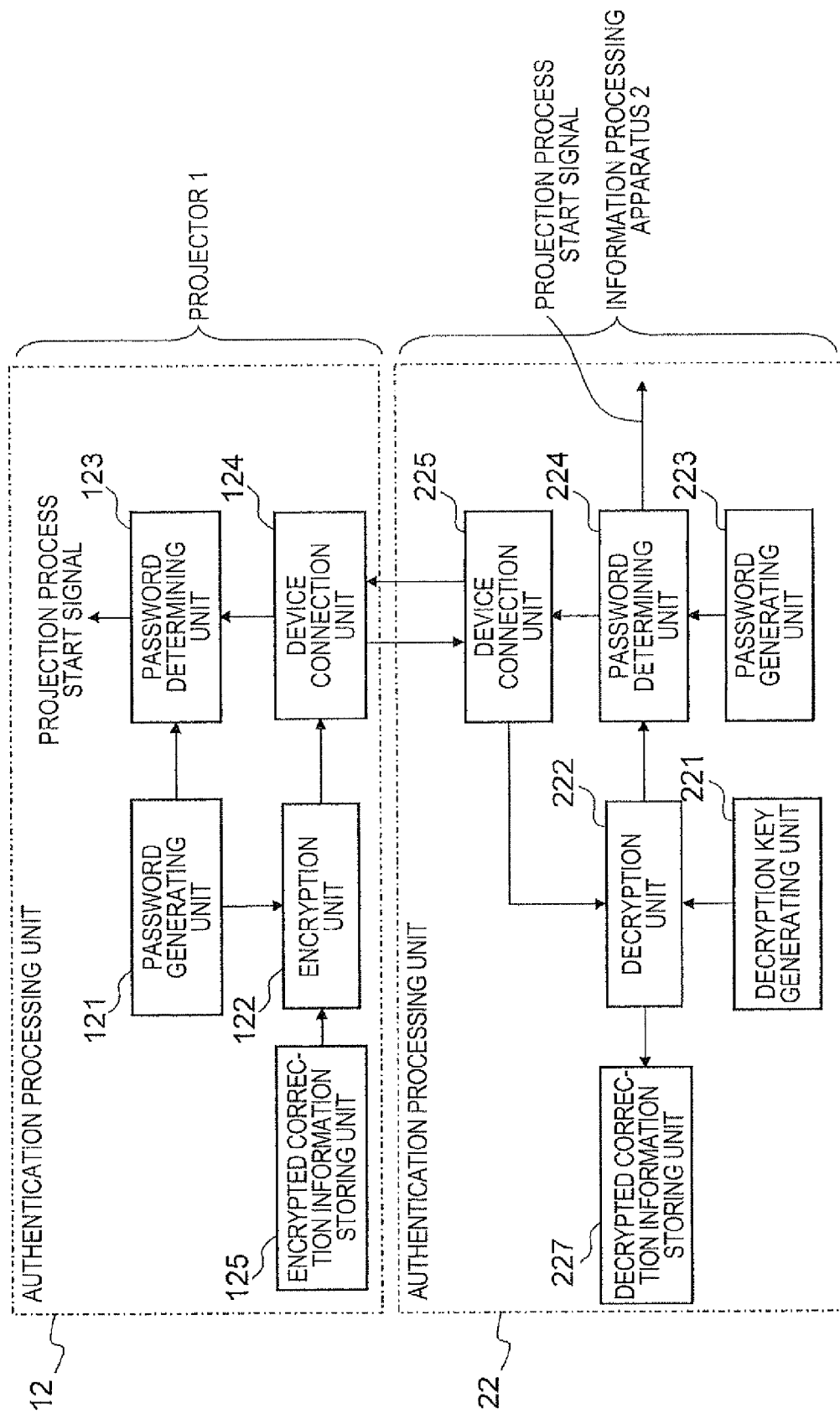
FIG. 5 is a diagram showing a configuration of a projector system according to Embodiment 3.

FIG. 5 is a diagram showing a configuration of a projector system according to Embodiment 3. In a projector system according to an embodiment of the invention, when there is inherent correction information for each projector, the projector 1 sends the inherent correction information of the projector to the information processing apparatus 2, the information processing apparatus 2 performs an image process based on the inherent correction information of the projector sent from the projector 1, and the image data on which the image process is performed is sent to the projector 1. As described above, when the transfer of the inherent correction information of the projector from the projector 1 to the information processing apparatus 2 is required, it is preferable that the correction information is encrypted to be sent to the information processing apparatus 2 as encrypted correction information.

In the projector system according to Embodiment 3, the projector 1 maintains the correction information in an encrypted status. In other words, as shown in FIG. 5, an encrypted correction information storing unit 125 which maintains the encrypted correction information is included. The encrypted inherent correction information of the projector which is stored in the encrypted correction information storing unit 125 is sent to the information processing apparatus 2 together with an encryption password which is encrypted by an encryption unit 122 as encryption data.

The encryption of the correction information is performed by the same encryption unit as is used for encrypting a password. Accordingly, the decrypting in the information processing apparatus 2 side can be performed by using the same decryption key as is used for decrypting an encrypted password.

The information processing apparatus 2 has a decrypted correction information storing unit 227 which stores the decrypted correction information (referred to as decrypted correction information). The encrypted data (encrypted correction information and encrypted password) sent from the projector 1 is decrypted by the decryption unit 222 using the decryption key, and the decryption correction information which has been decrypted is stored in a decrypted correction information storing unit 227. The decryption password which has been decrypted by the decryption unit 222, like in the projector system according to Embodiment 1, is supplied to the password determining unit 224, and the same process as in the projector system according to Embodiment 1 is performed.

When the image data processing unit 21 of the information processing apparatus 2 processes the image data to be projected by the projector 1, the correction information stored in the decrypted correction information storing unit 227 is also considered.

Since a function of sending the inherent correction information of each projector to the information processing apparatus 2 as encrypted correction information is provided as in the projector system according to Embodiment 3, there is an advantage in that the inherent correction information of each projector can be sent in a hidden status to the information processing apparatus when the inherent correction information of each projector is sent to the information processing apparatus 2.

In addition, by maintaining the inherent correction information to be kept in the projector as encrypted correction information generated by using an encryption unit having a high data compression ratio the data amount of the inherent correction information to be kept in the projector 1 can be reduced. Accordingly, the storage capacity of the storing unit of the projector 1 can be effectively used.

In the projector system according to Embodiment 3, as in a projector system according to Embodiment 2 (see FIG. 4), it is possible to acquire the decryption key used for decrypting the encrypted data (encrypted correction information and encrypted password) from a site on the Web.

In the projector systems according to Embodiments 1 to 3, when the projector 1 is determined to be a formal projector in the information processing apparatus 2 and the software of the information processing apparatus 2 is determined to be formal software in the projector 1 side, that is, only when the authentication is succeeded in both the information processing apparatus 2 and the projector 1 sides, the projection processes are respectively started in the information processing apparatus 2 and the projector 1, but the projection processes to be performed by the information processing apparatus 2 and the projector 1 may be started by regarding a case where the information processing apparatus 2 determines that the projector 1 is a formal projector as authentication success. In this case, since the projector 1 does not need to perform a password determining process, the password determination unit 123 is not required, and thereby the configuration and the process of the projector 1 can be simplified further.

Embodiment 4

Figure 6:
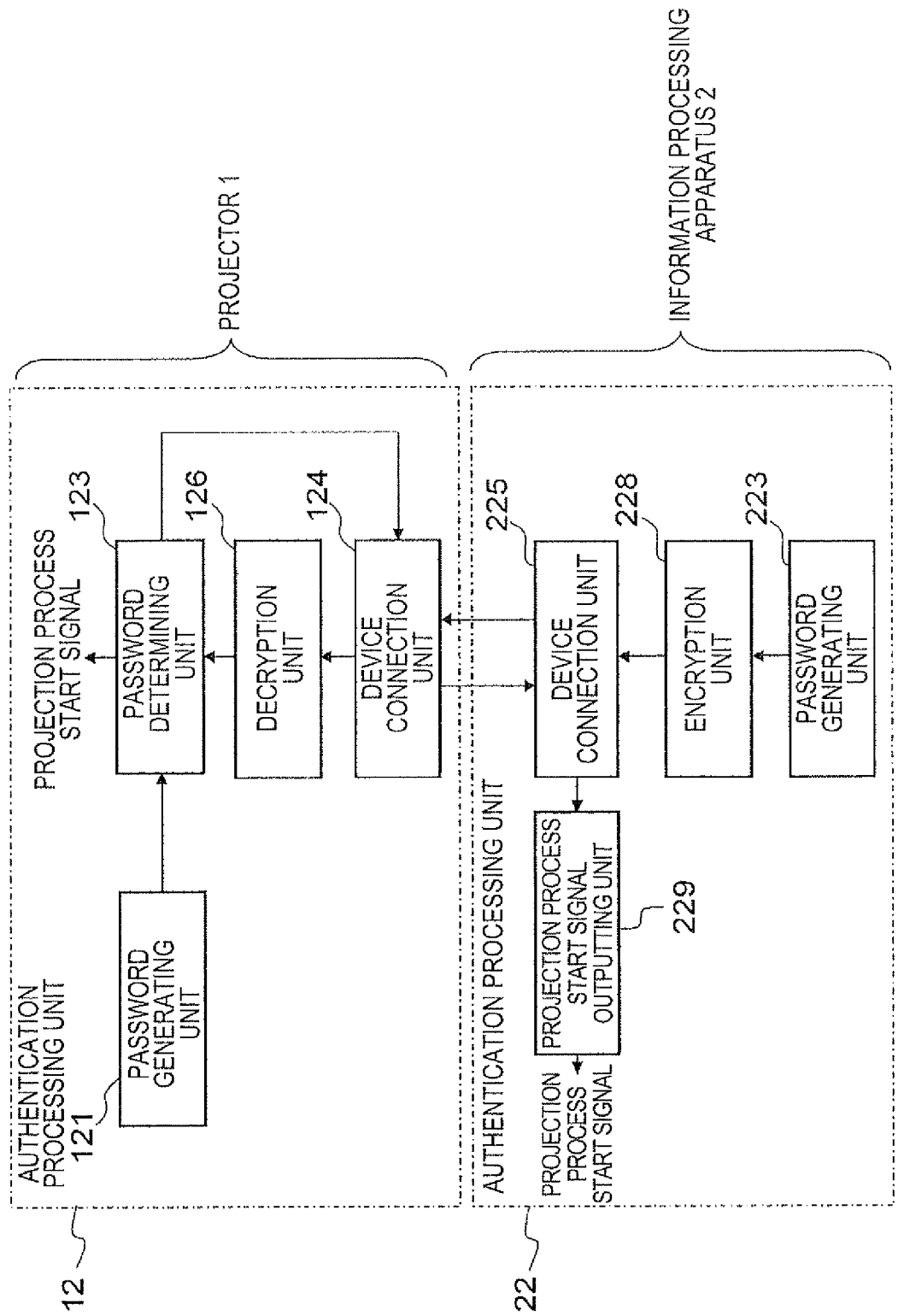
FIG. 6 is a diagram showing a configuration of a projector system according to Embodiment 4.

FIG. 6 is a diagram showing a configuration of a projector system according to Embodiment 4. As shown in FIG. 6, the authentication processing unit 12 of the projector 1 side includes a password generating unit 121 which generates a password used for determining whether to start the projection process to be performed by the information processing apparatus 2 and the projector 1, a decryption unit 126 which receives an encrypted password sent from the information processing apparatus 2 as input and decrypts the input encrypted password, a password determining unit 123 which determines whether the decrypted password is correct and outputs a signal (referred to as a projection process start signal) which directs to start the projection process (for example, driving an optical system or an electro-optical modulation apparatus) to be performed by the projector to the image projection unit 11 (see FIG. 1) or the like together with outputting a signal indicating the success of authentication to the information processing apparatus 2 in a case where the password is correct, and a device connection unit 124 which connects the projector 1 and the information processing apparatus 2 to each other for the communication therebetween.

The authentication processing unit 22 of the information processing apparatus 2 includes a password generating unit 223 which generates the same password as a password generated by the projector 1, an encryption unit 228 which encrypts the password generated by the password generating unit 223 and outputs the encrypted password, a projection process starting signal outputting unit 229 which outputs a signal (projection process start signal) directing to start the projection process (image process including a correction process and the like) to be performed by the information processing apparatus 2 to the image data processing unit 21 (see FIG.

1) and the like, and a device connection unit 225 which connects the information processing apparatus 2 and the projector 1 to each other for the communication therebetween.

Under this configuration, in the information processing apparatus 2 side, the same password as a password generated by the projector 1 is generated by the password generating unit 223. Thereafter, the password generated by the password generating unit 223 is encrypted by the encryption unit 228. The encryption unit 228 outputs the encrypted password to the projector 1 through the device connection unit 225.

In the projector 1 side, the decryption unit 126 receives the encrypted password as input through the device connection unit 124 and decrypts the encrypted password using the decryption key to acquire a decrypted password.

In the projector 1, it is determined whether the decrypted password is correct by comparing the decrypted password and the password generated by the password generating unit 121 using the password determining unit 123. When the passwords are not identical as the result of the determination, it is determined that the decrypted password is incorrect, and the projection process is not performed.

On the other hand, when the decrypted password and the password generated by the password generating unit 121 are identical, so that the decrypted password is determined to be correct by the password determining unit 123, the password determining unit 123 outputs a signal (authentication signal) indicating the success of the authentication to the information processing apparatus 2 together with outputting a signal (projection process start signal) directing to start the projection process to be performed by the projector 1 to the image projection unit 11 (see FIG. 1) and the like.

In the information processing apparatus 2 side, when the projection process start signal outputting unit 229 receives the authentication signal sent from the projector 1 through the device connection unit 225, the projection process start signal outputting unit 229 outputs a signal (projection process start signal) directing to start the projection process to be performed by the information processing apparatus 2 to the image data processing unit 21 (see FIG. 1) and the like.

Figure 7:
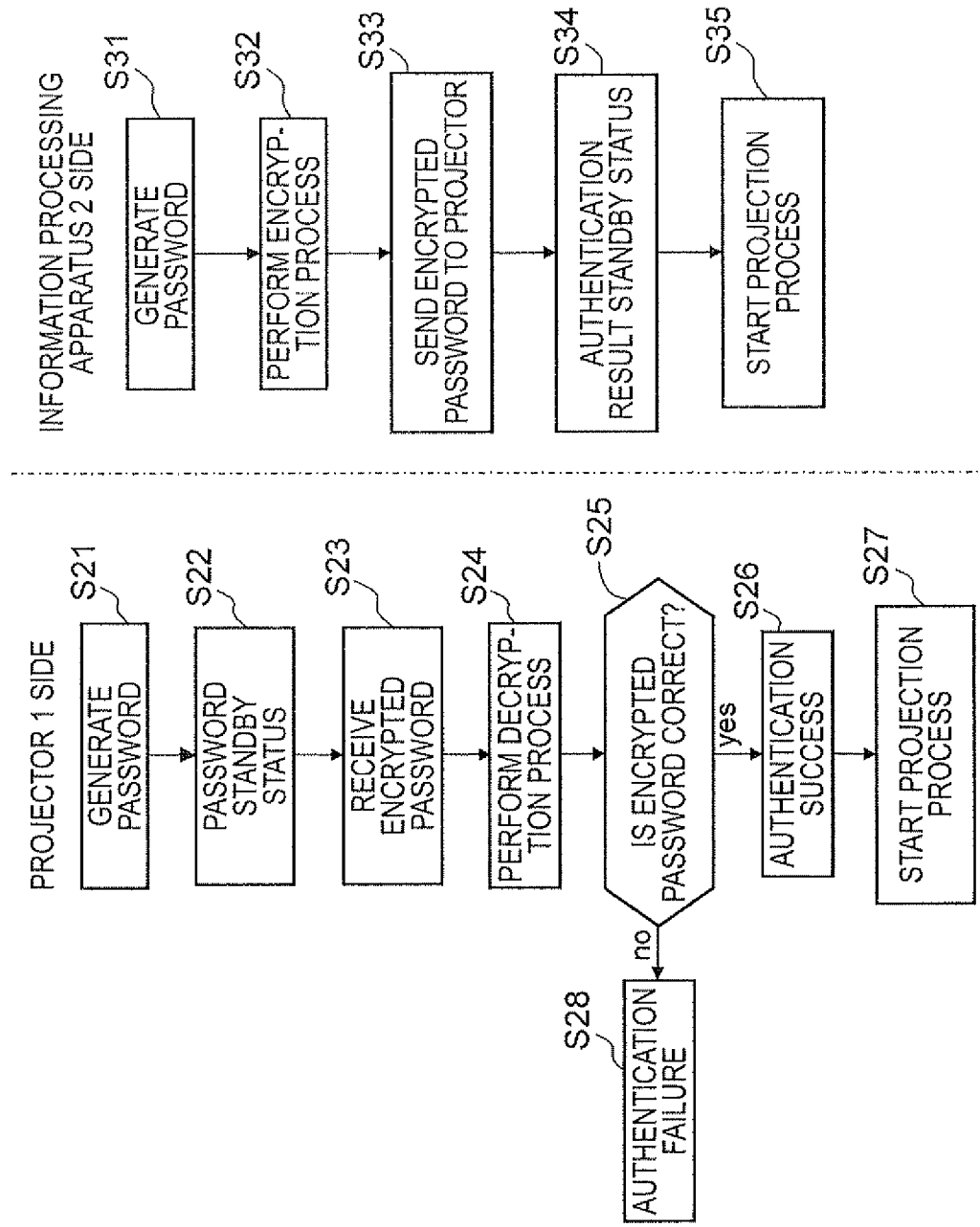
FIGS. 7A and 7B are flowcharts showing a sequence of an authentication process of a projector system according to Embodiment 4.

FIGS. 7A and 7B are flowcharts showing a process sequence of a projector system according to Embodiment 4. FIG. 7A shows a process sequence performed by the projector 1, and FIG. 7B shows a process sequence performed by the information processing apparatus 2. Since the process in each step is described above, here, the sequence of the whole process will be described briefly.

At first, the projector 1 generates a password (step S21) and becomes in a status waiting for a password (encrypted password) from the information processing apparatus 2, that is, a password standby status (step S22).

The information processing apparatus 2 side generates a password (step S31), encrypts the generated password (step S32), transfers the encrypted password to the projector 1 (step S33), and then, becomes in a standby status waiting for the result of the authentication from the projector 1 (step S34).

When the encrypted password is received from the information processing apparatus 2 (step S23), the projector 1 decrypts the received encrypted password (step S24) and determine whether the password (decrypted password) that has been decrypted is correct (step S25). When the decrypted password is correct, the projector determines the success of the authentication (step S26) and performs the projection process which should be performed in the projector side (step S27). On the other hand, when the decrypted password is incorrect as the result of determination on whether the decrypted password is incorrect in step S25, the failure of authentication is determined (step S46). When the failure of authentication occurs, the projection process is not performed.

When the information processing apparatus 2 receives an authentication signal from the projector 1 in the authentication standby status (step S34), the information processing apparatus 2 starts the projection process to be performed by the information processing apparatus 2 (step S35).

As described above, in a projector system according to Embodiment 4, the projector 1 determines whether the password sent from the information processing apparatus 2 is correct, and when the password is correct, the projector 1 starts the projection process to be performed by the projector itself together with sending authentication information indicating the success of authentication to the information processing apparatus 2. Accordingly, the information processing apparatus starts the projection process which should be performed by the information processing apparatus 2 itself.

The security of the projector system can be also acquired by performing the authentication process like in projector systems according to Embodiments 1 to 3. The process performed in the projector system according to Embodiment 4, as in the above described projector systems according to Embodiments 1 to 3, is a process in an initial stage prior to actual projection. Accordingly, the hardware and software of the projector system can be relatively simplified, compared with as case where the whole image data is decrypted, and accordingly, the advantage of a host-based projector is not lost. In addition, a projector system capable of acquiring security can be configured.

Embodiment 5

Figure 8:
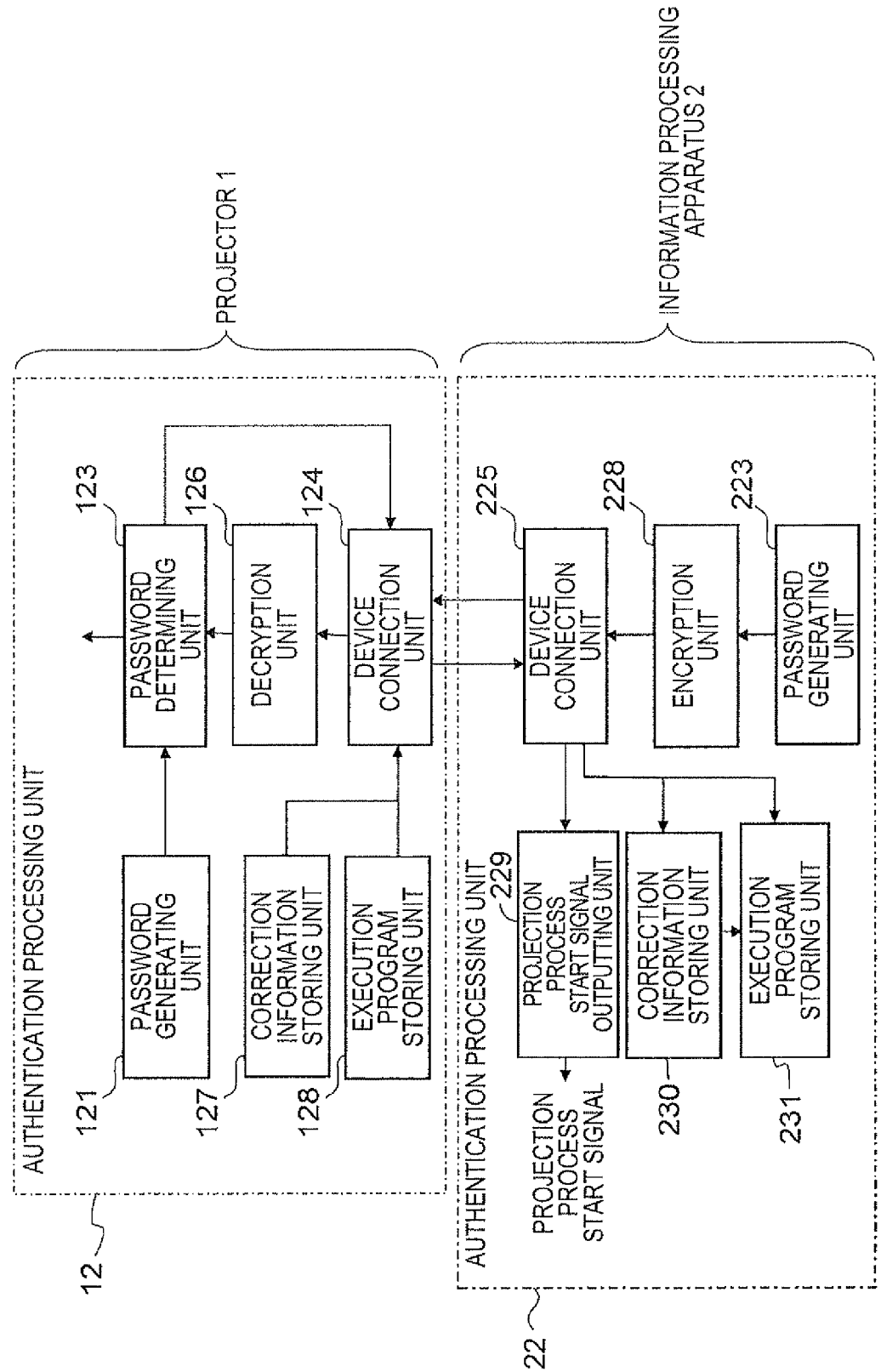
FIG. 8 is a diagram showing a configuration of a projector system according to Embodiment 5.

FIG. 8 is a diagram showing a configuration of a projector system according to Embodiment 5. As shown in FIG. 8, the projector system according to Embodiment 5 has a correction information storing unit 127 which stores inherent correction information for each projector and an execution program storing unit 128 which stores an execution program to be performed by the information processing apparatus 2, in the authentication processing unit 12 of the projector 1 side in addition to the components (see FIG. 6) projector system according to Embodiment 4.

In addition, the projector system has a correction information storing unit 230 which stores correction information sent from the projector 1 side and an execution program storing unit 231 which stores an execution program sent from the projector, in the authentication processing unit 22 of the information processing apparatus 2 side.

FIGS. 9A and 9E are flowcharts showing a process sequence of a projector system according to Embodiment 5. FIG. 9A shows a process sequence performed by the projector 1, and FIG. 9B shows a process sequence performed by the information processing apparatus 2.

The processing steps S41 to S46 in the projector 1 side shown in FIG. 9A are the same as the steps S21 to S26 shown in FIG. 7A. The processing steps S51 to S54 in the information processing apparatus 2 side shown in FIG. 9B are the same as the steps S31 to S34 shown in FIG. 7B.

As shown in FIGS. 9A and 9B, a projector system according to Embodiment 5 is different from the projector system according to Embodiment 4 in that, when the password sent from the information processing apparatus 2 can be authenticated in the projector 1 side, the projector 1 sends the correction information and the execution program to the information processing apparatus 2 and the information processing apparatus 2 performs the projection process to be performed by the information processing apparatus 2 itself using the correction information and the execution program which are sent from the projector 1.

In FIGS. 9A and 9B, the step S45 and thereafter in the projector side and the step S54 and thereafter in the information processing apparatus 2 side will be described. When the decrypted password is correct as the result of the determination on whether the decrypted password is correct in step S45, the projector determines the success of authentication (step S46) and sends the execution program and the correction information to the information processing apparatus 2 (step S47). In addition, the projector 1 performs the projection process to be performed by the projector itself (step S48).

When the information processing apparatus 2 receives the execution program and the correction information which are sent from the projector 1 (step S55) in the authentication standby status (step S54), the information processing apparatus 2 starts the projection process to be performed by the information processing apparatus itself using received execution program and the correction information (step S56).

As described above, since the execution program and the correction information are sent from the projector 1 to the information processing apparatus 2 only when the password generated by the information processing apparatus 2 is determined to be correct by the projector 1, the image data to be projected to the projector 1 can be appropriately processed in the information processing apparatus 2.

Since the information processing apparatus 2 cannot perform the image process itself when the execution program does not exist and the information processing apparatus 2 cannot have appropriate image data when the correction information does not exist, the information processing apparatus 2 cannot perform an appropriate image process even when one between the execution program and the correction information is missing. Accordingly, one between the correction information and the execution program may be maintained in the projector 1 side, and the correction information or the execution program which is maintained in the projector 1 may be sent to the information processing apparatus 2 when the password sent from the information processing apparatus 2 can be authenticated in the projector side 1.

For example, in an initial status, the correction information is kept in the projector 1 side, and the execution program is kept in the information processing apparatus 2, and the correction information kept in the projector 1 may be sent to the information processing apparatus 2 from the projector 1 when the password can be authenticated by the projector 1.

Alternatively, to the contrary, in an initial status, the execution program is kept in the projector 1 side, and the correction information is kept in the information processing apparatus 2, and the execution program kept in the projector 1 may be sent to the information processing apparatus 2 from the projector 1 when the password can be authenticated by the projector 1.

As described above, according to a projector system in Embodiment 5, the same advantage as a projector system in Embodiment 4 can be acquired. In addition, in the projector system according to Embodiment 5, the correction information and/or the execution program are sent from the projector 1 to the information processing apparatus 2 only when the password generated by the information processing apparatus 2 can be authenticated by the projector 1 side, and the information processing apparatus 2 side performs the projection process to be performed by the information processing apparatus 2 using the correction information and/or the execution program sent from the projector 1.

Accordingly, since the information processing apparatus side cannot perform a projection process appropriately as long as the password generated by the information processing apparatus 2 is not authenticated by the projector side, the security of the projector system can be improved still further.

In the projector systems according to Embodiments 4 and 5, as in Embodiments 1 and 2, the password may be configured to include changing information such as date and time in addition to an object number.

The present invention is not limited to the above-described embodiments, and various changes inform may be made therein without departing the gist of the invention. For example, in Embodiments 1 to 3, when the decrypted password is not determined to be correct as the result of the determination on whether the decrypted password is correct in the information processing apparatus 2 side, it is possible to display a message urging the user to attend in the projector 1 or the information processing apparatus 2 along with not starting the projection process. As the message, for example, a message indicating that the projector in use is not formal may be used.

Likewise in Embodiments 1 to 3, when the decrypted password sent from the information processing apparatus 2 to the projector 1 is not identical to a password generated by the projector side 1, it is possible to display a message urging the user to attend in the projector or the information processing apparatus 2 along with not starting the projection process. As the message, for example, a message indicating that the software in use is not formal may be used.

As described above, to display a message urging the user to attend in a case where the decrypted password is not determined to be correct may be applied to the projector systems according to Embodiments 3 and 4.

The authentication process in the projector 1 side described in the above-described embodiments may be written in an authentication processing program for the projector as a program to be executable in the projector 1, and the written authentication processing program for the projector may be recorded in various recording mediums. Similarly, the authentication process in the information processing apparatus 2 may be written in an authentication processing program for the information processing apparatus as a program to be executable in the information processing apparatus 2, and the written authentication processing program for the information processing apparatus may be recorded in various recording mediums.

Accordingly, some aspects of the invention include a recording medium storing the authentication processing program for a projector and a recording medium storing the authentication processing program for an information processing apparatus. Alternatively, the authentication processing program for a projector and the authentication processing program for an information processing apparatus may be configured to be acquired from a network.

The entire disclosure of Japanese Patent Application Nos. 2006-102961, filed Apr. 4, 2006 and 2007-31613, filed Feb. 13, 2007 are expressly incorporated by reference herein.

What is claimed is:

1. A projector system comprising:
an information processing apparatus supplying image data to a projector; and
the projector projecting an image based on the image data supplied from the information processing apparatus,
wherein the information processing apparatus includes:
a device connection unit of the information processing apparatus which enables communication between the projector and the information processing apparatus;

a password generating unit of the information processing apparatus which generates a password used for determining whether to start a process for projection; and an encryption unit of the information processing apparatus which encrypts the password and outputs the encrypted password to the projector through the device connection unit of the information processing apparatus, and wherein the projector includes:
- a device connection unit of the projector which enables communication between the information processing apparatus and the projector;
- a decryption unit of the projector which decrypts the encrypted password input through the device connection unit of the projector using a decryption key; and
- a password determining unit of the projector which has functions of determining whether the decrypted password is correct and outputting a signal directing to start the process for projection to be performed by the projector in a case where the decrypted password is correct.

2. The projector system according to claim 1,
wherein the projector further includes a password generating unit of the projector which generates a password used for determining whether to start the process for projection, and
wherein the password generating unit of the information processing apparatus generates a same password as the password generated by the password generating unit of the projector.

3. The projector system according to claim 1,
wherein the projector sends an authentication signal to the information processing apparatus when the decrypted password is correct, and
wherein the information processing apparatus further includes a projection process start signal output unit which outputs a signal which directs to start the process for projection to be performed by the information processing apparatus based on the authentication signal sent from the projector.

4. The projector system according to claim 1,
wherein the projector has functions of keeping an execution program which is used for performing the process for projection to be performed by the information processing apparatus in the information processing apparatus and sending the execution program to the information processing apparatus in a case where the decrypted password is correct, and
wherein the information processing apparatus performs the process for projection to be performed by the information processing apparatus using the execution program sent from the projector.

5. The projector system according to claim 1,
wherein the projector has functions of keeping correction information used for performing inherent correction of the projector and sending the correction information to the information processing apparatus in a case where the decrypted password is correct, and
wherein the information processing apparatus corrects the image data using the correction information sent from the projector.

6. The projector system according to claim 1,
wherein the password is generated by using information that changes by value.

7. The projector system according to claim 1,
wherein the password and the decryption key are generated based on an inherent number of the projector.

8. A projector projecting an image based on image data supplied from an information processing apparatus, the projector comprising:
- a device connection unit of the projector which enables communication between the information processing apparatus and the projector;
- a decryption unit of the projector which decrypts an encrypted password input through the device connection unit of the projector using a decryption key;
- a password generating unit of the projector that generates a password used for determining whether to start a process for projection; and
- a password determining unit of the projector which has functions of determining whether the decrypted password is correct when the generated password matches the decrypted password and outputting a signal directing to start the process for projection to be performed by the projector in a case where the decrypted password is correct, wherein the projector has functions of keeping an execution program that is used for performing the process for projection to be performed by the information processing apparatus and sending the execution program to the information processing apparatus in a case where the decrypted password is correct, and wherein the information processing apparatus performs the process for projection using the execution program sent from the projector.

9. A method of an information processing apparatus supplying image data to a projector, the method comprising:
- enabling communication between the projector and the information processing apparatus;
- generating a password used for determining whether to start a process for projection;
- encrypting the password; and
- outputting the encrypted password to the projector through a device connection unit of the information processing apparatus;
- decrypting, by the projector, the encrypted password using a decryption key;
- determining, by the projector, whether the decrypted password is correct
- sending, by the projector, an authentication signal to the information processing apparatus when the decrypted password is correct;
- outputting, by the information processing apparatus, a signal which directs to start the process for projection to be performed by the information processing apparatus based on the authentication signal sent from the projector;
- receiving an execution program from the projector; and
- performing the process for projection using the received execution program sent from the projector.

* * * * *